(12) United States Patent
Mezic et al.

(10) Patent No.: US 10,673,886 B1
(45) Date of Patent: *Jun. 2, 2020

(54) ASSIGNING AND REPRESENTING SECURITY RISKS ON A COMPUTER NETWORK

(71) Applicant: PacketSled, Inc., Santa Barbara, CA (US)

(72) Inventors: Igor Mezic, Santa Barbara, CA (US); Troy Molsberry, Santa Barbara, CA (US); Ante Kalajzic, Santa Barbara, CA (US); Aleksandr Andrejcuk, Santa Barbara, CA (US); Bryan Elliot, Santa Barbara, CA (US)

(73) Assignee: PacketSled, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/584,627

(22) Filed: Sep. 26, 2019

(51) Int. Cl.
  *H04L 29/06* (2006.01)
  *H04L 12/24* (2006.01)
(52) U.S. Cl.
  CPC .......... *H04L 63/1425* (2013.01); *H04L 41/16* (2013.01); *H04L 41/22* (2013.01)
(58) Field of Classification Search
  CPC ...... H04L 63/1425; H04L 41/16; H04L 41/22
  See application file for complete search history.

(56) References Cited

U.S. PATENT DOCUMENTS

| | | | |
|---|---|---|---|
| 2006/0047807 A1* | 3/2006 | Magnaghi | H04L 41/0677 709/224 |
| 2007/0283436 A1* | 12/2007 | Duffield | H04L 63/1425 726/23 |
| 2014/0096249 A1* | 4/2014 | Dupont | G06F 21/00 726/23 |
| 2016/0042287 A1* | 2/2016 | Eldardiry | G06F 21/00 706/14 |
| 2016/0203036 A1* | 7/2016 | Mezic | G06F 11/079 714/819 |
| 2018/0255076 A1* | 9/2018 | Paine | H04L 63/1433 |
| 2018/0316695 A1* | 11/2018 | Esman | G06Q 20/4016 |
| 2018/0324199 A1* | 11/2018 | Crotinger | G06F 17/18 |
| 2019/0124099 A1* | 4/2019 | Matselyukh | H04L 41/16 |

* cited by examiner

*Primary Examiner* — Brandon S Hoffman
*Assistant Examiner* — William A Corum, Jr.
(74) *Attorney, Agent, or Firm* — SoCal IP Law Group LLP; Steven Sereboff; Angelo Gaz

(57) ABSTRACT

Methods and systems for visualizing, analyzing, archiving and securing computer and internet of things (IoT) data networks are disclosed. The system includes a data collection device (sensor), preprocessing unit, analysis unit containing at least the Koopman mode analysis unit, and a postprocessing unit. The methods include Koopman mode analysis, support vector machines or deep learning used to compute the baseline, detect and rank known and unknown threats to the system, visualize and archive them. The methods also include creating and representing an Artificial Intelligence (AI) determined risk level indicators; using combined intel and notice alert severities with the AI risk level indicators to rank the alerts; using the AI indicators to create zero day risks; an AI Button to show the AI indicators and ranked alerts on a computer screen; and graphic user interfaces (GUI) to intuitively represent and interact with the AI indicators and ranked alerts.

28 Claims, 14 Drawing Sheets
(7 of 14 Drawing Sheet(s) Filed in Color)

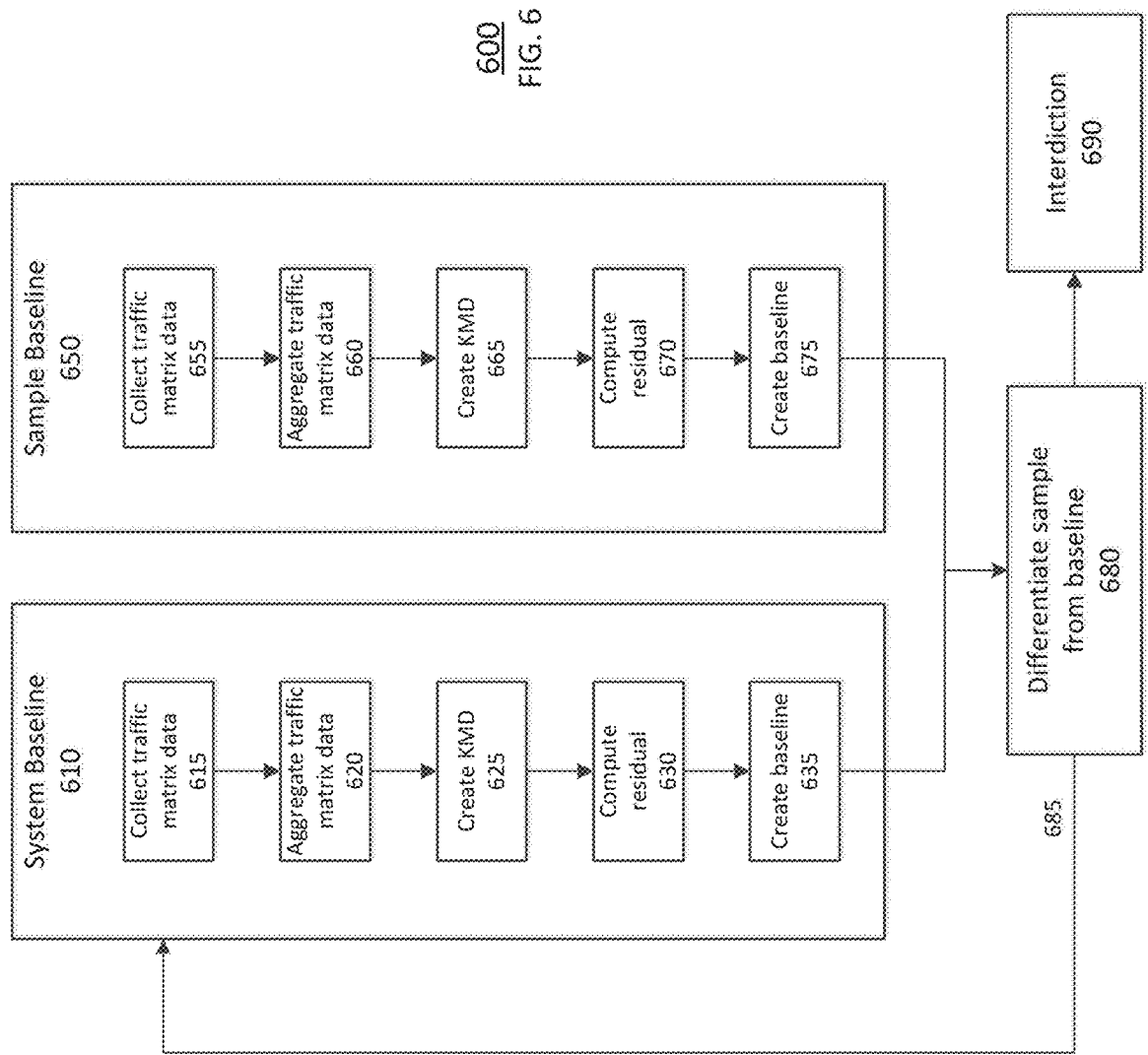

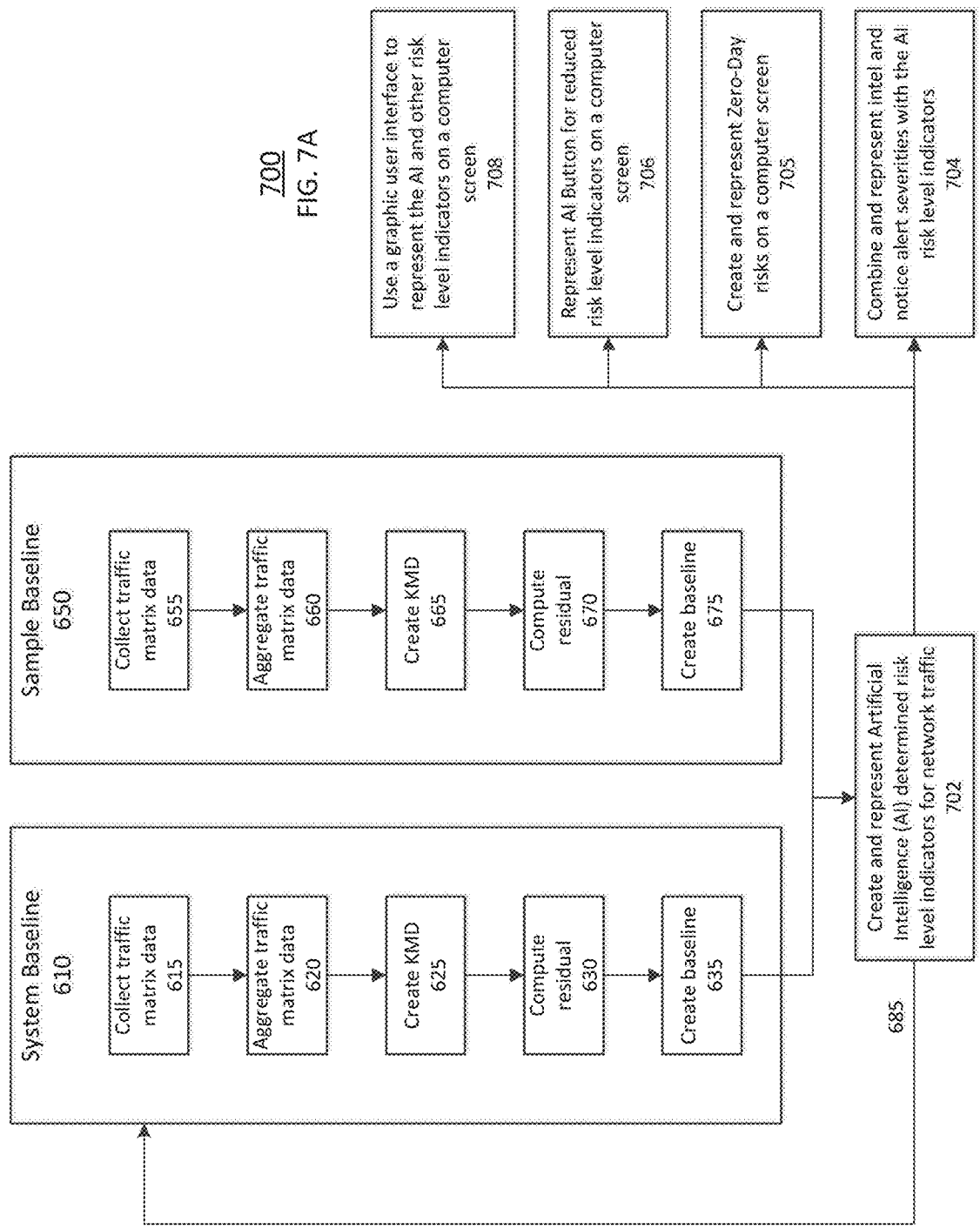

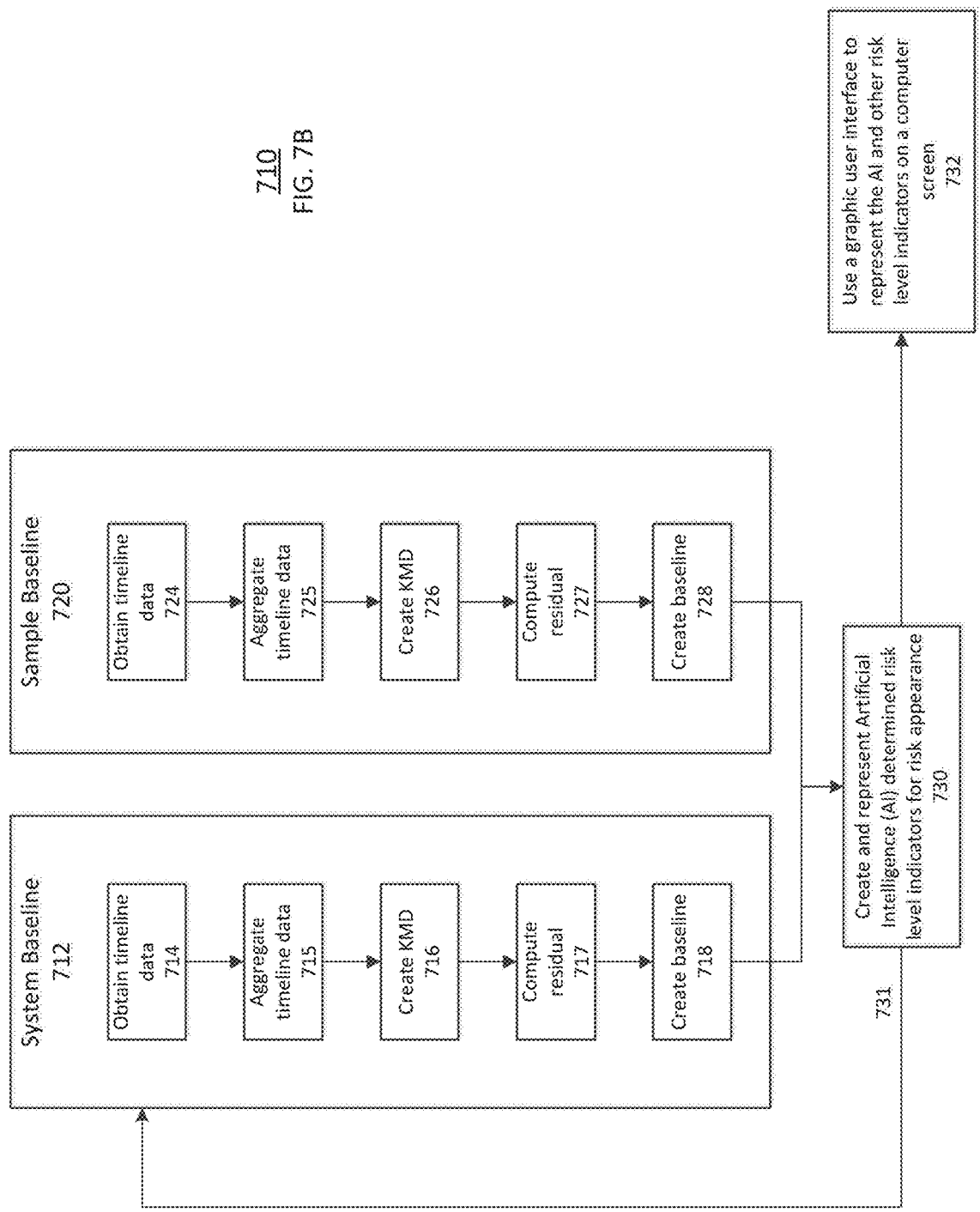

740

760

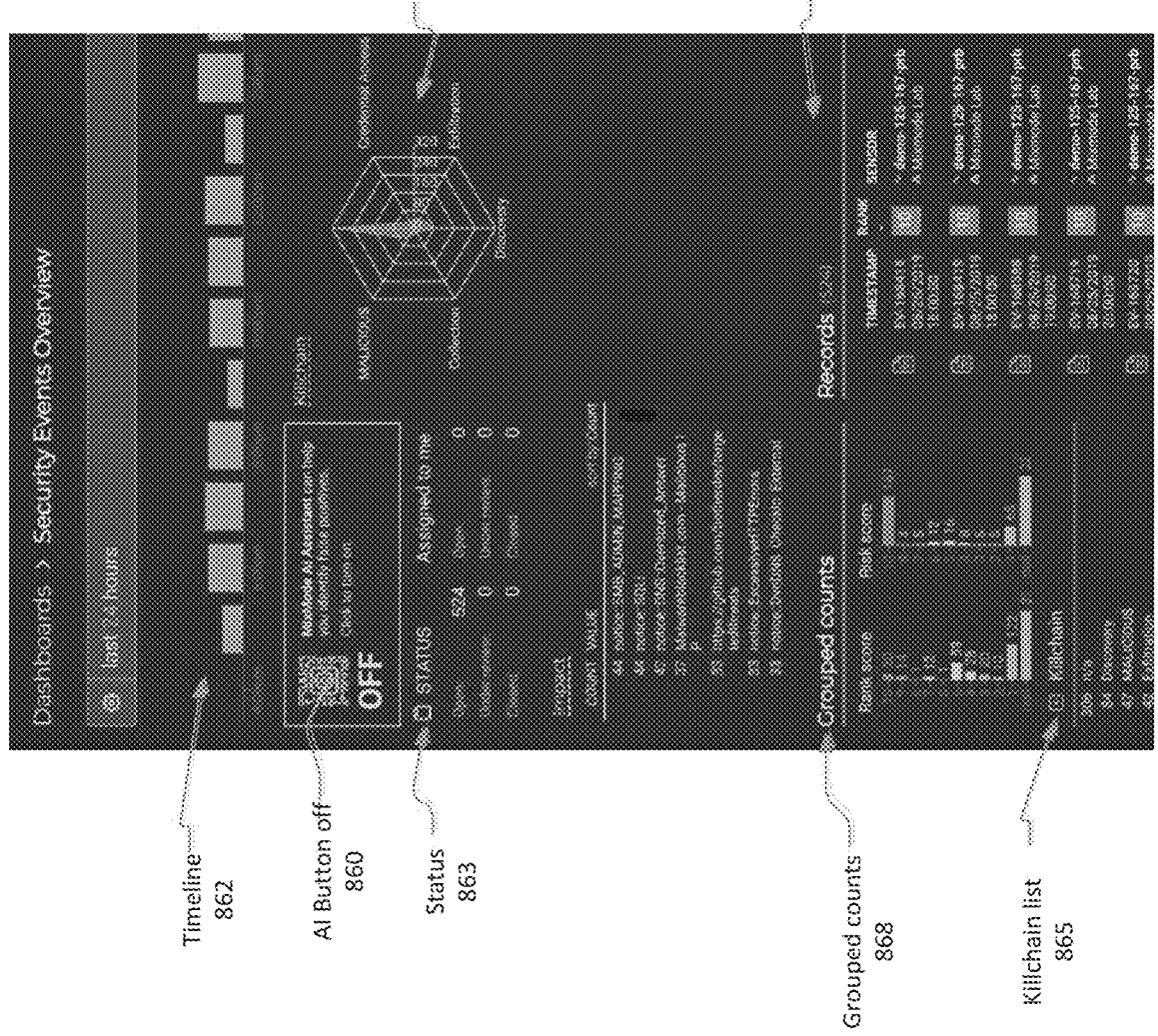

US 10,673,886 B1

ASSIGNING AND REPRESENTING SECURITY RISKS ON A COMPUTER NETWORK

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to data network security.

Description of the Related Art

The proliferation of computer and device (Internet of Things) networks using a variety of communication protocols has changed the nature of business and communication in revolutionary ways. It also dramatically affected security of data in general, and customer privacy and intellectual property security in particular.

The security threat is rapidly expanding, and network security professionals and corporations are struggling to keep up with the pace of threat innovation. The major underlying problem is the size of the underlying data streams. In order to detect a security threat, a network security threat might need to examine, even on a local network, traffic on $10^8$ source-destination pairs.

The nature of current threat-detection techniques can be classified as rule-based, statistics-based and machine learning-based. The literature also classifies intrusion detection by system type as misuse detection and anomaly detection. In misuse detection, the signatures of threats that already occurred are stored in a database, and one of the threat detection techniques is deployed to provide a match or no-match between the network events and signatures of threat events. Misuse detection cannot detect new threats. In anomaly detection, the system uses one of the threat detection techniques by identifying network traffic that significantly deviates from the baseline profile. However, anomaly detection systems are typically relegated to small subsets of data, since the computational effort needed to establish a baseline can be excessive for even a moderate-size network.

DESCRIPTION OF THE DRAWINGS

This patent or application file contains at least one drawing executed in color. Copies of this patent or patent application publication with color drawing(s) will be provided by the Office upon request and payment of the necessary fee.

FIG. 6 is a flowchart for securing a network through baseline comparisons.

FIG. 7A is a flowchart for creating and representing Artificial Intelligence (AI) determined risk level indicators on a computer network based on network traffic.

FIG. 7B is a flowchart for creating and representing Artificial Intelligence (AI) determined risk level indicators that exist on a computer network based on timeline data for appearance of alerts.

FIG. 8B is an example system GUI with an AI Button GUI in the AI-off status.

Figure 1:
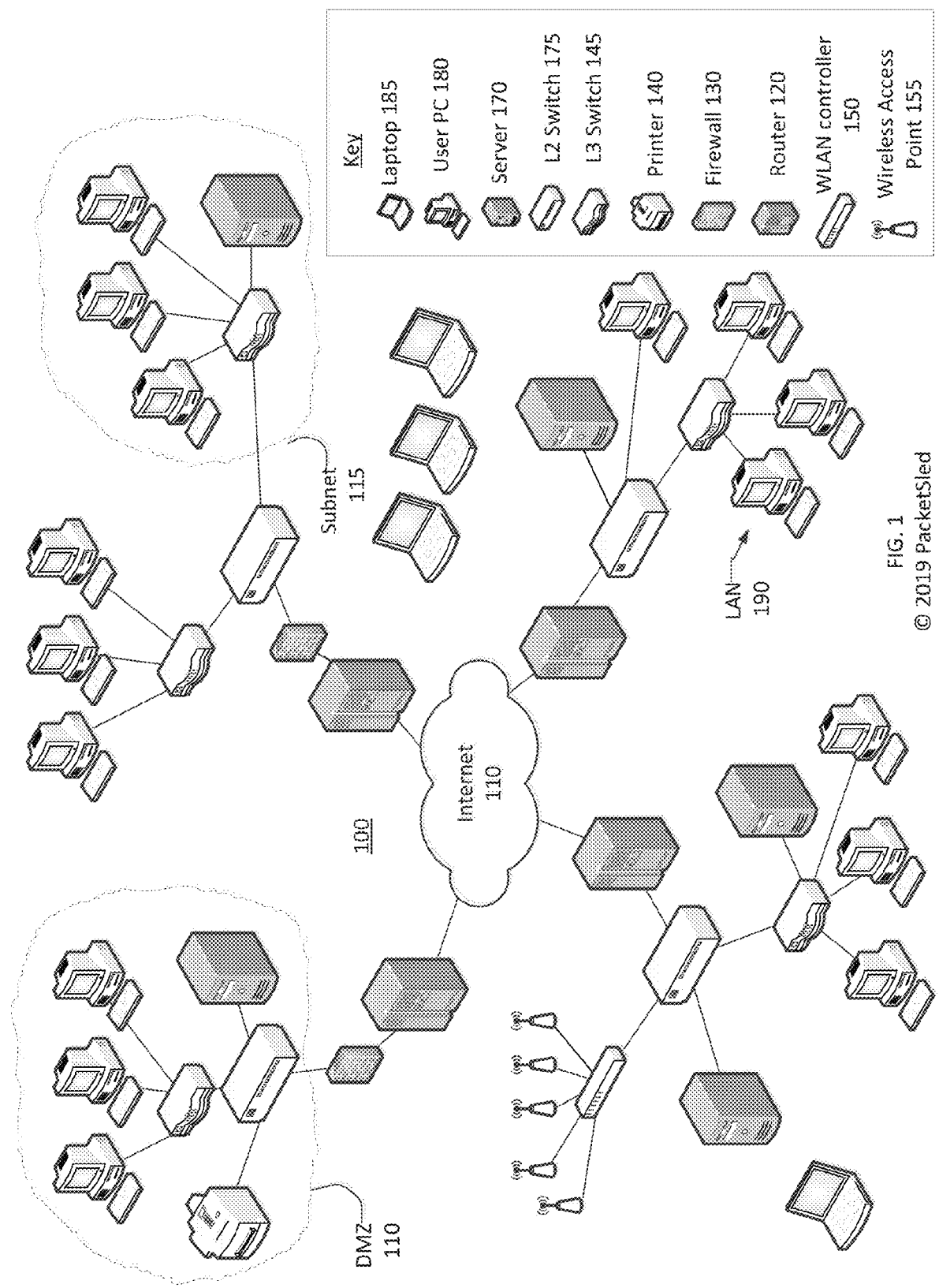
FIG. 1 is a diagram of multiple computers and devices interconnected in a network.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Prior work on network traffic analytics neglects the key driving forces in network dynamics: daily, weekly, monthly and seasonal cycles, and behavior (normal and abnormal) of machines and humans. Thus, it does not establish the context in which the network operates and cannot provide accurate information on threats occurring in real time. The consequence of this is that alarm-type systems predominate the prior work and create an overwhelming burden for the system operator instead of providing him/her with ability to visualize, archive and combat threats. The current description mitigates this problem.

Artificial intelligence (AI) systems and methods are disclosed for visualizing, representing, analyzing archiving and securing a computer or internet of things (IoT) networks. Systems and methods are disclosed which establish a baseline of a network of at least two computers or devices where at least one of the two is communicating with the other over a communication channel, and perform analysis, visualization, archival procedures and security procedures on the network. Systems and methods are disclosed for updating the baseline of the system to indicate changed behavior due to addition of software or hardware. This disclosure includes systems and methods to perform misuse detection and anomaly detection on the said network by utilizing the established baseline and comparing the current state of the network with the established baseline. The difference of the current state and the baseline can then be compared it with established libraries of normal changes to the system and anomalous changes to the system. Systems and methods are disclosed for human-machine interaction; in particular, communication with an operator enabling action on the information provided with the system and instructing the system on the classification of new security threats. Systems and methods are disclosed for reduction of false misuse and anomaly positives in network security systems.

The systems and methods include creating and representing AI risk level indicators; using combined intel and notice alert severities with the AI risk level indicators to produce a ranking of the alerts; representing zero day risks on the computer screen; representing an AI Button for reduced risk level indicators on a computer screen; and using a graphical user interface (GUI) to represent the AI risk level indicators and other risks, rankings and risk indicators on the computer screen.

The systems and methods include assigning security risks to and ranking security risks of events or alerts on computer networks. The level of security risk may be computed from an assessment of traffic data and metadata (e.g., notice and notice alert severity). The risk assigned to an event can be computed by comparing the baseline traffic at the current time interval with the baseline traffic at a similar time interval occurring in the past. The risk is combined with the severity indicator of the event to rank security events. The performance of the system is represented by a performance indicator button. The performance of the system, notice and/or intel alerts can be further indicated by a timeline showing security events volume.

Referring now to FIG. 1 there is shown a diagram of multiple computers and devices (e.g., network components) interconnected in a network 100. The network 100 is a data or computer communication network that may be or include various LANs, MANs, WANs, wireless LANs or internetworks, such as those shown, or any other network of two or more computers or devices. The network 100 may include user-controlled end point devices such as laptops 185 and user PCs 180, as well as automated end point devices such as servers 170, printers 140, robots (not shown) or sensors (not shown). Automated end point devices may be user-controllable or fully automated. The network may also include various intermediate or interface devices such as layer 2 switches 145, layer 3 switches 175, firewalls 130, routers 120, WLAN controllers 150 and wireless access points 155. The various devices and interconnections of the network 100 may be arranged to include LANs 190, subnets 115 and DMZs 110.

Figure 4:
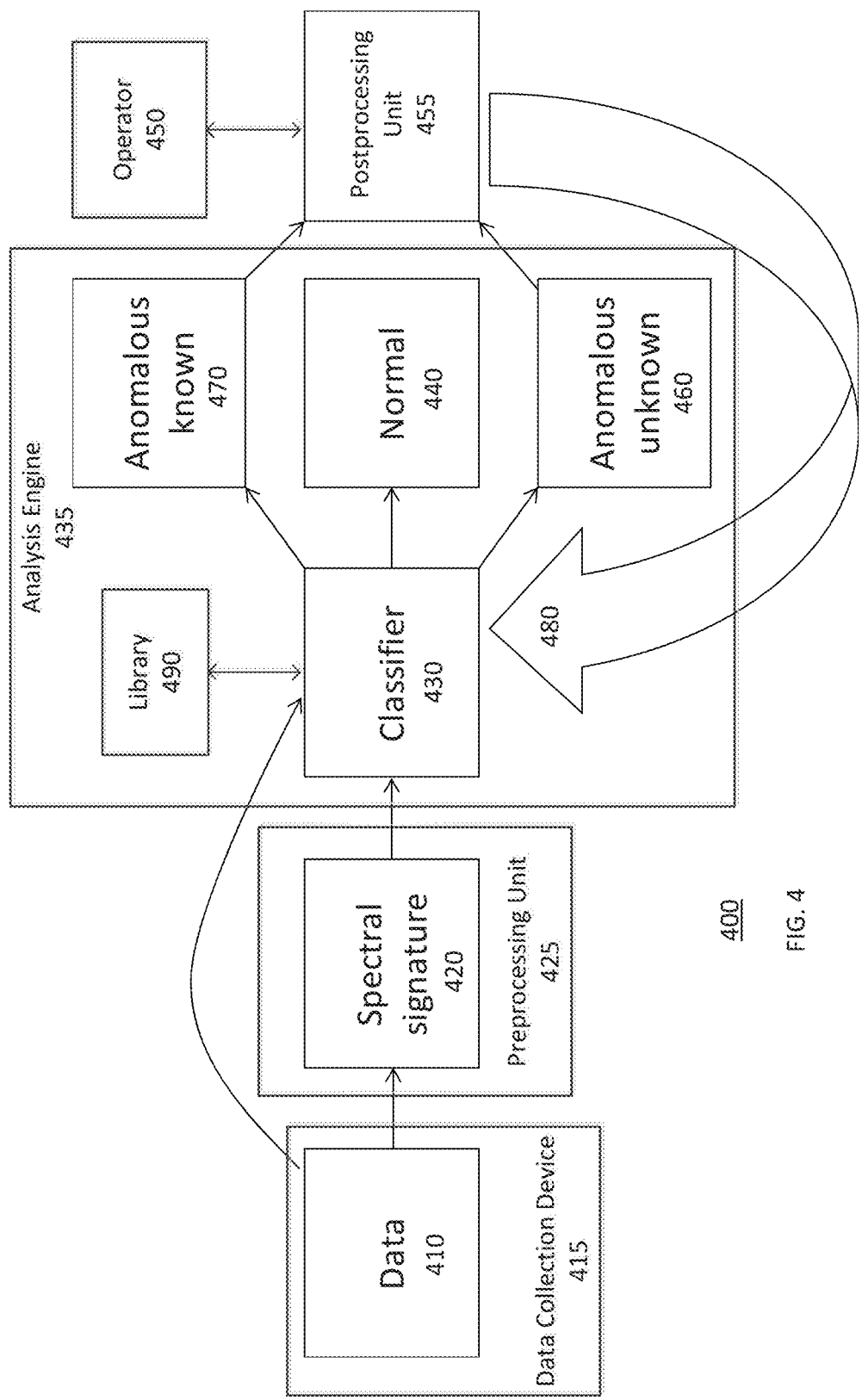
FIG. 4 is a schematic representation of a network security system operation.

Data transmission between two network devices (or nodes) in the system 100 of FIG. 1 may be represented schematically in a system 400 as in FIG. 4. In practice, streams of raw data from numerous connections are collected and processed using the system 400. System 400 may be an artificial intelligence (AI) system. The system 400 may be one of the network devices of network 100 such as a server 170 and/or user PC 180.

The system 400 includes a data collection device 415 such as a sensor, data monitor, or other device, a preprocessing unit 425, an analysis engine 435 containing at least a Koopman mode analysis unit, and a postprocessing unit 455.

The base unit of a network as it regards to the Koopman mode decomposition (KMD) analysis is a flow object which describes a data communication connection and its related properties (data source, data destination, communication protocol, etc.). The connection may be between two network devices or nodes of network 100. Once the connection is terminated (e.g., the connection is established from data source to destination), flows objects may be recorded into a connection log which may be subsequently saved into a database. The flow objects may each comprise a single alphanumeric value or a set of alphanumeric values mathematically processed from raw data collected from the plurality of sensors over time. The stream of flow objects may consist of a finite dimensional nonlinear system.

A flow object may be the communication data transmitted by and received by or at an IP address. A stream of these flow objects may be the data transmitted and received by a number of or all of the IP addresses that are in the network. The stream may be the network data communication traffic of the network 100, such as including the traffic components of the network. In some cases, the stream may be a plurality of network traffic matrix data over a period of time. Each flow object may be a traffic matrix of the plurality.

A flow object may be a count of alerts for a data communication connection and its related properties. An alert can be an AI risk level indicator, a risk, a ranking and/or a risk indicator. Such a count may be used to determine timeline data for appearance of alerts over time. For example, the timeline data can include the number of appearances of one or more alerts or types of alerts over a period of time for a data communication connection.

A flow object may include or be intel and/or notice alert severity. In some cases, only one of the flow objects includes them. In other cases, between 2 and half of the objects include them. In one case, all of the objects include them.

Risks determined using the stream of flow objects, timeline data of risks, network traffic and/or traffic matrix data can be shown over time by a timeline, as records and/or as counts, such as noted for FIGS. 4-10. For instance, representations of AI determined risk level indicators derived based on the stream, timeline data, network traffic and/or traffic matrix data can be shown in timelines, records and/or counts of FIGS. 8A-10.

The data collection device 415 provides raw data 410 to the preprocessing unit 425. This raw data 410 is network communication data, i.e., data transmitted through the network from a device originating the data to a destination device. The data may be communicated according to a network protocol and/or in packets. The raw data may be the stream of flow objects of the network 100.

The raw network data 410 is then analyzed by the preprocessing unit 425 using a spectral operator theoretic methodology which transforms the finite dimensional nonlinear system of the stream of flow objects to an infinite linear set. In accordance with the spectral operator theoretic methodology, the stream of flow objects is decomposed. The preprocessing unit 425 computes spectral signatures 420 of the network from observables on the raw data 410. An observable is any single numerical value or set of numerical values obtained from the raw data via mathematical processing. For example, an observable might be the total volume of network communication traffic in a day between a specific source internet protocol (IP) address and a specific destination IP address. Another example of an observable is the number of alarms over a pre-specified period of time. An alarm is a message indicating trouble in a network, such a slow or failing component, or an outage. The preprocessing unit 425 may be a Koopman mode analysis unit. Koopman mode analysis here consists of computing Koopman modes of temporal evolution of observables. In Koopman mode analysis, time domain data are transformed into a complex plane showing growth, decay and frequency, along with Koopman modes and eigenfunctions for the time domain eigenvalues. Thus, the preprocessing unit 425 outputs KMD components corresponding to the input flow objects that are at least one of (a) oscillating, (b) exponentially growing, (c) exponentially decaying, (d) mean, and (e) stochastic. In some cases, oscillating describes a mathematically periodic component, such as a component having an oscillation at a frequency; and mean describes a mathematically averaged component, such as a component that is the average of multiple numbers.

Spectral properties of the signatures 420 of the Koopman mode analytics from the preprocessing unit 425 corresponding to the flow objects may then be used by a classifier 430 in the analysis engine 435 to classify them into a number of categories, such as normal 440, anomalous known 470 or anomalous unknown 460. The normal category is indicative of normal behavior in the corresponding flow objects. The anomalous known category is indicative of anomalous behavior in the corresponding flow objects having a known cause. The anomalous unknown category is indicative of anomalous behavior in the corresponding flow objects having an unknown cause.

The normal behavior may refer to a) the mean, b) the oscillating component, or c) the stochastic component of the signal. For example, it may be that the mean amount of x bytes is exchanged on Monday between two IP addresses. Deviations from that mean indicate the anomaly of the mean. However, the exchange between 9 AM and 6 PM consists normally of y bytes, while the exchange before 9 AM and after 6 PM on that Monday consisted normally of total of z bytes. This is the normal oscillating component in the example. The normal stochastic component has a distribution associated with it. Deviations from the distribution indicate anomaly. The anomaly can be due, among other, to administrative reasons (e.g., addition of a router to the network) or due to an ongoing attack.

The classifier 430 may use a library 490 as a reference for classification and/or categorization. The library 490 may be a database which correlates component values to categories. The classifier 430 may further sort the components into the categories using the library 490. The classifier 430 may compare and correlate component values output by the preprocessing unit 425 to categories stored in the library 490 to perform the classification.

The classification may be utilized by the postprocessing unit 455 for securing the respective network (e.g., network 100) for threat prevention. Network activity associated with normal behavior 440 may be allowed. Network activity associated with anomalous known behavior 470 or anomalous unknown behavior 460 may be interdicted. That is, based upon how the behavior is classified, the system may block or modify any one or more of individual IP activity, individual protocol activity, a subnetwork activity, a full network activity. The action can be performed automatically or in conjunction with the human operator 450. Specifically, the system and/or user can block or modify individual IP activity, individual protocol activity, a subnetwork activity, or a full network activity of network activity associated with anomalous known behavior 470 or anomalous unknown behavior 460.

The categorization provided to the postprocessing unit 455 may be presented to a human operator 450. If the behavior is anomalous and unknown, the human operator 450 can interact with the system 400 and label the behavior, as well as change the classification. In some cases, the operator 450 re-classifies the behavior as anomalous and known; or re-classifies the behavior as normal. The system 400, through the postprocessing unit 455, is additionally enabled for learning via an interface with the human operator 450, where the interaction leads 480 to additional classification of previously unknown threats, and removal of alarms that are recognized as false misuse and/or anomaly positives by the AI system 400. For example, the interaction 480 may update the engine 435 or library 490.

In some cases, the categorization and/or classification (e.g., for FIG. 4) may be utilized by the postprocessing unit 455 for creating and representing Artificial Intelligence (AI) determined risk level indicators on the respective network (e.g., network 100). This creating may be creating an AI determined risk level indicator for each of the flow objects from at least one of the normal behavior, anomalous known behavior and anomalous unknown behavior of each of the flow objects. The AI determined risk level indicator for each of the flow objects may be based on whether the anomalous known category and/or the anomalous unknown category exists for each of the flow objects.

It is noted that although system 400 describes decomposing and/or sorting using a Koopman mode analysis/representation of the stream of flow objects, other modes and/or mathematical representations may be used in place of a Koopman mode representation. For example, preprocessing unit 425 may be a mode and/or analysis unit other than a Koopman mode analysis unit that outputs components corresponding to the input flow objects that are at least one of (a) oscillating, (b) exponentially growing, (c) exponentially decaying, (d) mean, and (e) stochastic.

Examples of representing the created AI determined risk level indicators in a GUI are shown in FIGS. 8A-10. Representing the risk level indicator in a GUI may be or include displaying, visualizing (e.g., as in FIGS. 2-3), presenting and/or showing the risk level on a computer screen. It may be or include showing the risk level indicator on as noted at FIGS. 7A-10. For example, the AI determined risk level indicators may be show in timelines or over time, such as in timelines, records and/or counts of FIGS. 8A-10. Other risks based on the AI determined risk level indicators may also be shown along with the AI determined risk level indicators and in the figures.

The AI determined risk level indicators may be combined with intel and notice alert severities to produce ranking of alerts that are represented on a computer screen for each of the flow objects (e.g., see also FIGS. 7A-10). The intel and notice alert severity for each of the flow objects may be a) a note associated with a file that is part of the stream of flow objects, b) a based engine applied to the stream of flow objects and/or c) a third party indicator applied to the stream of flow objects. The ranked alerts may be shown alone, with the AI determined risk level indicators and/or with other risk indicators in a GUI on a computer screen.

The combination may be a mathematical combination of an AI determined risk level indicator with a related intel and notice alert severity, such as for the same flow object, communication link, traffic matrix data, and/or network traffic component. The combination may be an addition, average, geometric mean, square of the multiplication or the like that combines two numbers. The network traffic components may include local (internal to the computer network) network traffic; outbound (from inside to the computer network to the outside) network traffic; inbound (from outside to the computer network to the inside) network traffic; and/or a subnetwork traffic.

In addition, one or more "Zero-Day" risks may be created for each of the flow objects and/or represented on a computer screen (e.g., see also FIGS. 7A-10). A "Zero-Day" risks may be a real time, immediate or current risk. The risk may be a network, IP or flow object threat, discovery alert and/or alarm. Such a risk may be a previously unknown threat detected in current flow object data and/or detected in the anomalous unknown category of the flow objects. Such a risk may have only been discovered or identified in the last five minutes. The zero-day risk alerts may be shown alone, with the AI determined risk level indicators and/or with other risk indicators in a GUI on a computer screen.

Also, an AI Button may be represented on the screen for reducing the amount of risk level indicators represented on the computer screen (e.g., see also FIGS. 7A-10). The AI button may be a GUI that represents using the created AI determined risk level indicators and/or combination of those indicators and the intel and notice to reduce the risks shown on a computer screen. For example, only risks identified by those two analyses will be shown when the AI button is activated. This showing may be combined with a prior or other risk showing for comparison. The AI button may be shown alone, with the AI determined risk level indicators and/or with other risk indicators in a GUI on a computer screen.

The AI button may be based on the AI risk level indicator for each of the flow objects having the anomalous known category and/or the anomalous unknown category. When it is in an on status the screen may only show or make a distinction to show only the AI risk level indicators for each of the flow objects having the anomalous known category and/or the anomalous unknown category.

In some cases, the categorization and/or classification (e.g., for FIG. 4) may be performed by system 400 for data 410 or flow objects that are counts of alerts or notices over a period of time for data communication connections and their related properties of network 100 (e.g., see also FIGS. 7B-10). Each alert can be an AI risk level indicator, a risk, a ranking and/or a risk indicator. Each count may be an anomalous known category or anomalous unknown category for each data communication connection that is input to the KMD of FIG. 4.

Such a count may be used to determine timeline data for appearance of alerts over time for the connection. For example, the timeline data can include the number of appearances of one or more alerts or types of alerts over a period of time for the connection. Based on these inputs, the system 400 can create and represent Artificial Intelligence (AI) determined risk level indicators for the counts of risks of each of the data connections on the respective network (e.g., network 100).

In addition, a graphic user interface (GUI) may be used to represent the above represented AI determined risk level indicators; the intel and notice combined with the AI determined risk level indicators; zero-day risks; and/or AI button. For example, the GUI's of FIGS. 2, 3, 7D-10 represent (e.g., visualize) the AI determined risk level indicators; the intel and notice combined with the AI determined risk level indicators; the zero-day risks; the AI buttons; the alerts on intel and the security risks.

Figure 2:
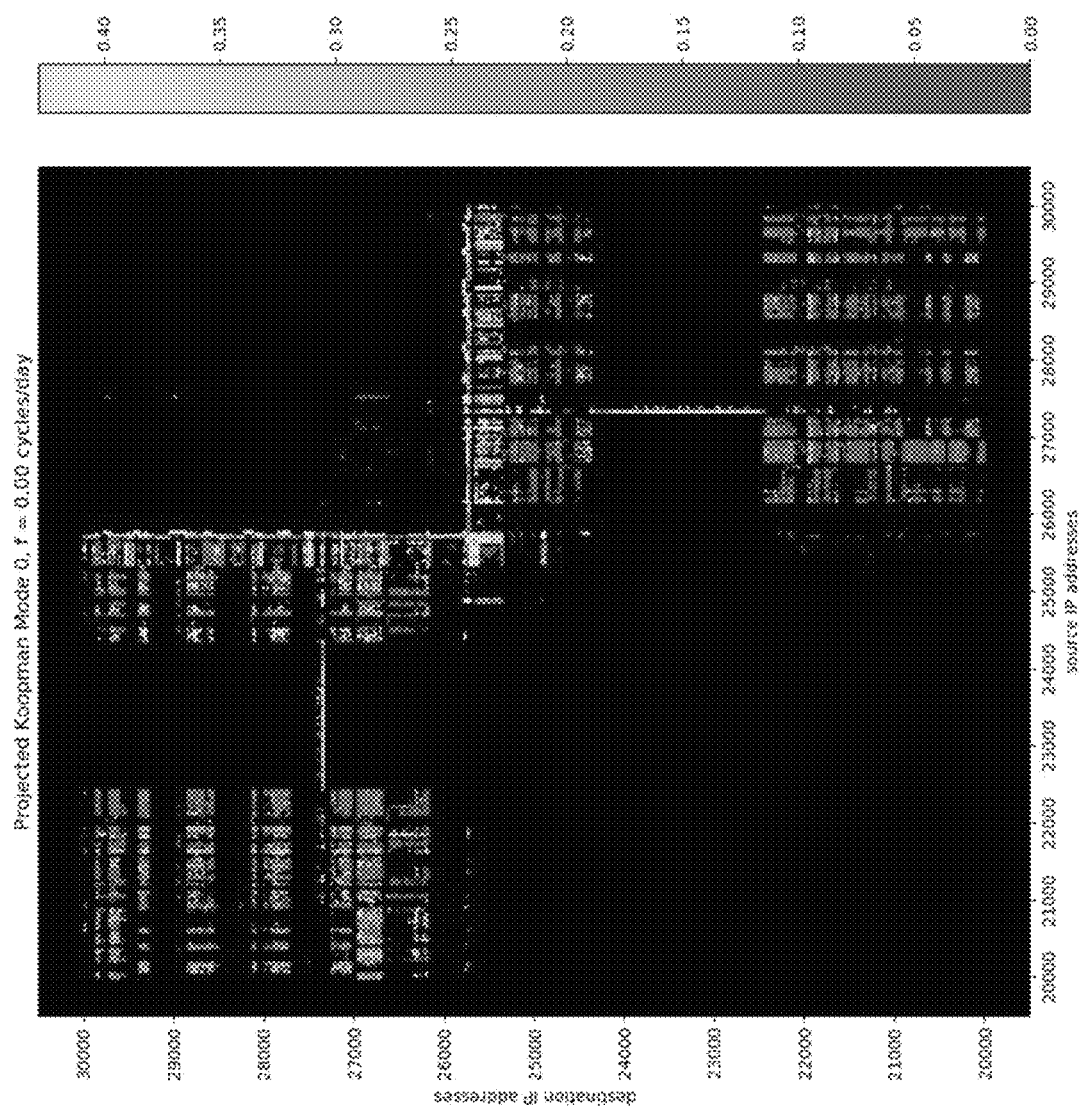
FIG. 2 is a visualization of a network as a graph, using a scalar field over the nodes of the graph whose nodes are source and destination IPs.
Figure 3:
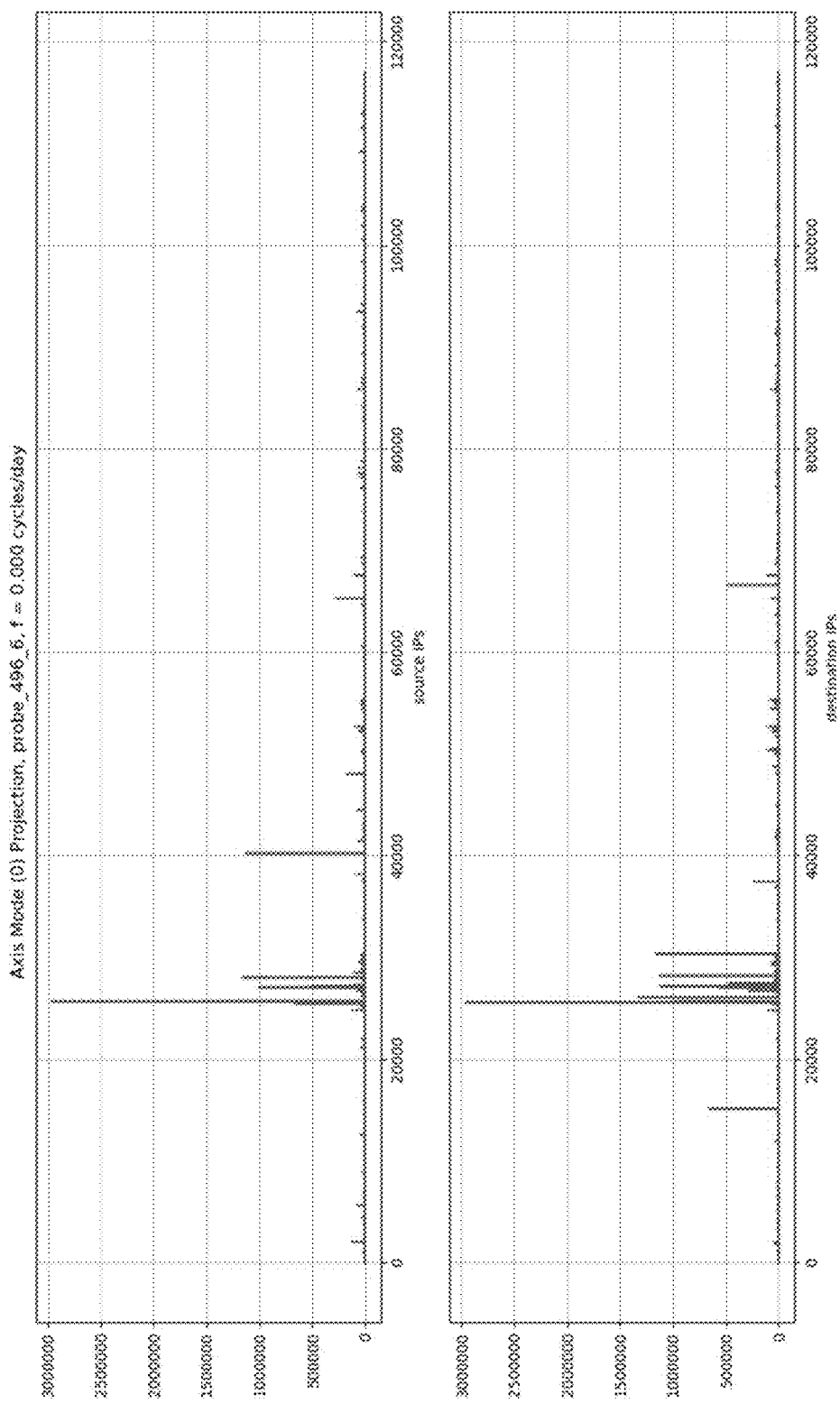
FIG. 3 is a visualization of a network using source and destination traffic graphs.

The operator 450 may be presented with a computer screen visualization or representation which represents the network as a graph and associating scalar or vector values to the nodes and edges of the said graph. The scalar or vector values may then be attributed a color and visualized on a computer screen. A typical scalar value can be the value of the Koopman mode on the edge or the node. An instance of a two dimensional, lattice-type graph and the visualization of the associated mean Koopman mode is shown in FIG. 2. Another instance of visualization, representing mean outgoing Koopman mode (or modes) and mean incoming Koopman mode (or modes) of the traffic over a linear graph of IP addresses is shown in FIG. 3. Additional representations are shown in FIGS. 7C-10. These visualizations depict at least one of the categories, and depict each category differently. The visualization may be overlaid upon a schematic or spatial network plan of the corresponding components such as that shown in FIG. 1. When the operator 450 makes interdictions or changes, the visualization may be dynamically updated to show changes in the network.

One benefit of the process represented by FIG. 4 is a reduction of false positives; and an increase in computer efficiency of identification of misuse and anomaly positives. For example, rather than have human operators consider all anomalies, attention may be limited to unknown anomalies. Furthermore, if a human operator has re-classified an unknown anomaly as normal or known anomalous, this reclassification goes into the library 490, thereby improving future classification and reducing misuse and anomaly false positives.

Classification of new categories of behavior may be stored into the library 490—an archival methodology. In addition, the library 490 may be updated from other sources. Archiving may also comprise selective storing of data, as decided by the analysis engine 435, or the analysis engine 435 in interaction with the human operator 450. The archiving of data can consist, for example, of the baseline only data storage; baseline and anomalous events data storage; or full processed data storage, and full raw data storage for the temporal period where anomalous behavior is detected.

Analysis Methodology

Analysis of network data communication is computationally intensive because of the large number of time events and data points. This issue is addressed by transforming the network dynamics into its Koopman counterpart, and pursuing Koopman mode decomposition (KMD) analysis. KMD analysis is a method of analyzing a temporal data stream by decomposing the data stream into components that are oscillating, exponentially growing or decaying; and those exhibiting behavior consistent with continuous spectrum (i.e., not oscillating, exponentially growing or decaying). The KMD of the data is an operator derived from a transformation which takes a finite dimensional nonlinear system of equations (or data) to an infinite set of linear equations (or data). The temporal data stream may be a stream of flow objects of network 100. In some cases, it also includes intel and notice alert severity. In some cases, it is timeline data of appearance of alerts.

There are multiple approaches to calculate the Koopman modes, such as using harmonic averages of the spatial field, or by using the Arnoldi algorithm. In particular, the harmonic average of linear dynamics (or periodic data), can be obtained by calculating the Fourier series. Here, harmonic averaging of the finite dimensional nonlinear system may be achieved by calculating a Fourier series of the finite dimensional nonlinear system. There are many efficient Fourier transform (FFT) methods available for this purpose. On the other hand, other computational methods may be used. Accordingly, the stream of flow objects may be decomposed using a dynamic mode decomposition type algorithm on the finite dimensional nonlinear system. The stream of flow objects may be decomposed by Laplace averaging the finite dimensional nonlinear system. A Krylov sequence and associated Krylov matrix can be generated. The Koopman modes are then extracted from this Krylov matrix using one of many algorithms including the Arnoldi method.

Support Vector Machine and Deep Learning Methodology

Deep learning may be utilized by system 400 such as to update or train any of device 415, unit 425, engine 435 and/or unit 455. This deep learning may use deep recurrent neural networks (RNNs); and/or support vector machines, to find representations of network data such as data 410 or preprocessed data from unit 425. Recurrent models repeatedly apply a transformation to elements of a sequence of inputs, thereby producing a sequence of outputs. Most RNN architectures, including long short-term memory (LSTM) networks and gated recurrent units (GRUs) share a common computational building block, described by the following equation:

$$\vec{h}_{t+1} = \phi(W\vec{x}_t + U\hat{h}_t + \vec{b}),$$

where $\vec{x}_t \in \mathbb{R}^n$ and $\vec{h}_t \in \mathbb{R}^m$, represent observation and the hidden state at time t; W and U are observation-to-state and state-to-state transition matrices; and b is a bias vector. To produce the next hidden state, this computational building block additively combines information from the current observation and the current hidden state h, followed by an element-wise non-linear function f (e.g., sigmoid, hyperbolic tangent function or radial basis function—e.g., Gaussian, commonly used in Support Vector Machine framework).

The deep learning or operator theoretic analysis provides the context, in the form of baseline and change of baseline, for the artificial intelligence (AI) system 400, and enables its interaction with human operators. This comparison of baselines is now discussed further with respect to FIG. 6. FIG. 6 is a flowchart 600 for securing a network 100 through baseline comparisons. In some cases, the process of the flowchart 600 can also be used to update or train system 400. The flowchart 600 includes first creating a system baseline 610 and later creating a sample baseline 650.

Creating the system baseline 610 includes collecting a plurality of traffic matrix data over a period of time 615. Collecting a plurality of traffic matrix data over a period of time may be or include recording and/or storing a stream of flow objects over the period of time as noted for FIG. 4. In some cases, each traffic matrix is a flow object. In some cases, the plurality of flow objects may also include intel and notice alert severity such as noted for being included in the stream of flow objects. In some cases, the plurality of traffic matrix data is timeline data of appearance of alerts. This may include device 415 collecting data 410. Next, the plurality of traffic matrix data is aggregated over a specified time interval 620. This may include unit 425 processing data 410 to create spectral signatures 420. Next a Koopman mode representation of the first aggregated data is created 625. This may include engine 435 classifying signatures 420 to create categories 440, 460 and 470. Next, a residual is computed by comparing the first Koopman mode representation and the aggregated data 630. Next, the system baseline is created out of first Koopman mode representation and the residual 635, includes categorization as described above.

The same process is used to create the sample baseline 650: collect traffic matrix data over a time period 655; aggregate the traffic matrix data 660; create the KMD of the aggregated data 665; compute the residual 670; and create the baselines out of KMD and the residual 675.

The flow 600 may involve the KMD analysis of network traffic formatted in a way that involves extracting the necessary data from the database (e.g., baselines at 635 and 675), formatting it correctly for the analysis calculation, running the data through KMD algorithms and reasoning about their outputs (e.g., at 680, 685 and 690). The input module of the system (e.g., the data collection device 415) pulls connection data or other data from the database (e.g., JSON files) regarding the timestamps of the available connections (for the required time window) and constructs a time matrix for the window. A time matrix contains, for example, the amount of traffic between each source-destination pair (each member of a pair defined by an IP address and the protocol used for the connection) at each arbitrarily set time step of the time window. This format is suitable as input for the provided KMD algorithms. The in-situ analysis then uses this matrix for the KMD analysis which produces Koopman eigenvalues and eigenvectors.

It is possible that a connection flow can last beyond the scope of the observed window. The data for these kinds of connections may be truncated for the observed time window and the raw (e.g., JSON formatted data) may be saved, e.g., to an external "pickup file" into a database. When a new time window is processed, the contents of this pickup file may be added to the traffic matrix generation procedure which then correctly parses the data as if the connection is fully active during the observation.

The sample baseline can then be tested against the system baseline to detect abnormal behavior in the network 680.

Based on the difference between the system baseline and the sample baseline, the system baseline may be updated 685. To differentiate the baselines, a comparison is made between how traffic matrix data is categorized between the two. As explained above, these differences may be used in a feedback loop into the system baseline 610.

Based upon categorization and differentiation, network data traffic may be interdicted 690 as discussed above.

The traffic matrices themselves, for each window, may also be saved in order to be available for the procedure of amending of the baseline at particular (longer) time intervals. Due to the network data being very large, some physical limits might be reached when processing connection data for establishing of baselines. A separate branch of the system may be delegated to creating a Koopman framework for analysis. Previously saved traffic matrices for the required baseline time interval may be processed so as to extract all communicating connection pairs (in that time interval). From this information, a mapping based on source/destination IPs may be created for further referencing. This map may be saved to the baseline database. Additionally, the total traffic in the network during the processed interval is saved as well (this is basically the sum of the traffic matrices) at the previously defined time step resolution. This data is then used to conduct an FFT analysis of the total traffic to establish significant periodicities in the signal. The frequencies of the significant modes are then used to compute projections of the Koopman modes which are used to calculate the modal noise of the system. Deviation of the in-situ observed data from the statistical baseline established via the above procedure gives a normality estimate for the behavior of the network.

The comparison of baselines of FIG. 6 is now discussed further with respect to FIG. 7A. FIG. 7A is a flowchart 700 for creating and representing Artificial Intelligence (AI) determined risk level indicators 702 on a computer network at 100 based on network traffic.

The flowchart 700 includes first creating a system baseline 610 and later creating a sample baseline 650. Creating the system baseline 635 at 610 (e.g., a baseline model) is the same as in FIG. 6. Creating the sample baseline 675 at 650 (e.g., a current baseline or a current model) is the same as in FIG. 6.

It is noted that although flowchart 600 and 700 describe creating Koopman mode representations of the aggregated data at 625 and 665, other modes and/or mathematical representations may be used in place of a Koopman mode representation, such as to compute the residuals at 630 and 670.

The flowchart 700 shows creating and representing artificial intelligence (AI) determined risk level indicators 702. Creating indicators 702 may include creating the timelines, records and/or counts of FIGS. 8A-10 based on flow object streams, timeline data, network traffic and/or traffic matrix data.

In some cases, based on the difference between the system baseline and the sample baseline, the AI determined risk level indicator for each of the first and/or second plurality of traffic matrix data over the first and/or second time period is created and represented 702. Creating at 702 may include computing a difference of (e.g., a difference between or contrast with) the sample baseline and the system baseline such as by testing the sample baseline can against the system baseline to detect abnormal behavior in the network as noted for differentiating at 680.

Creating and representing at 702 may include creating and representing on a computer screen, the AI determined risk level indicator for each of the first and second plurality of traffic matrix data over the first and second time period based on the anomalous known category and/or the anomalous unknown category of one of a) the difference between the system baseline (e.g., baseline model from prior data) and the sample baseline (e.g., current model from current data), b) the system baseline, or c) the sample baseline.

Examples of representing the AI determined risk level indicators from 702 are shown in timelines, records and/or counts of FIGS. 8A-10. The AI determined risk level indicators are show at each hour in the timeline data 812, and the like of FIGS. 8A-10. Other periods of time for data 812 are considered such as per 1, 5, 10, 15 or 30 minutes. Other risk levels, risks, rankings and risk indicators based on the AI determined risk level indicators are also shown in the figures.

Flowchart 700 also includes combining intel and notice alert severities with the AI risk level indicators to produce and represent a ranking of the alerts 704 (e.g., see also FIG. 10); creating and representing zero day risks on a computer screen 705 (e.g., see also FIG. 9); representing an AI Button for reduced risk level indicators on a computer screen 706 (e.g., see also FIGS. 8A-8B); and using a graphic user interface (GUI) to represent the AI risk level indicators and other risks, rankings and risk level indicators on a computer screen 708 (e.g., see also FIGS. 8A-10). Representing may be or include displaying, visualizing, presenting and/or showing on a computer screen. It may be or include showing the risk level indicator on as noted at 704-708.

Each of 704-708 may be based on or use the AI determined risk level indicators created at 702. In some cases, the process of the flowchart 700 can also be used to update or train system 400.

Figure 10:
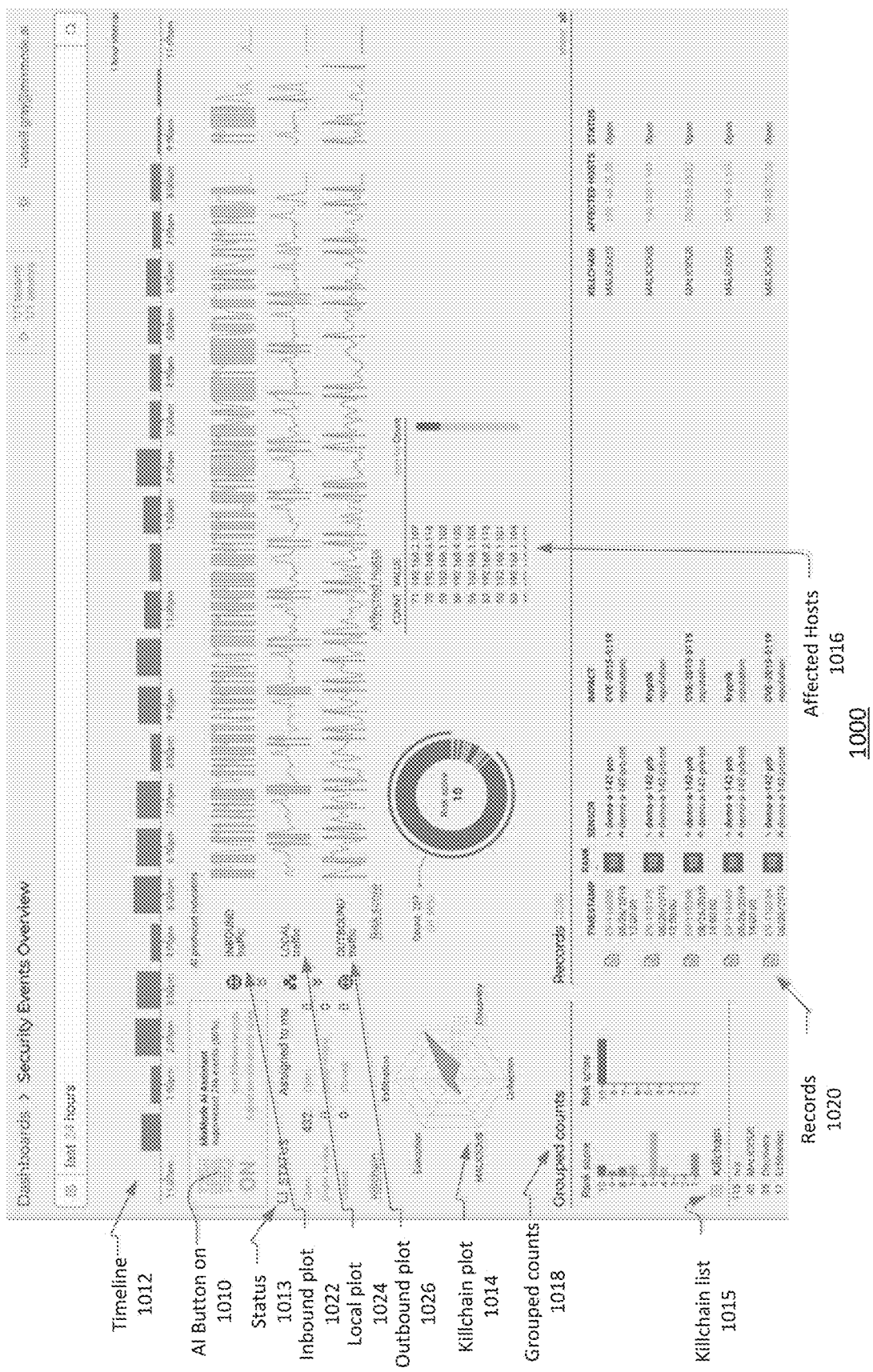
FIG. 10 is system GUI representation of combined intel and notice alert severities with the AI risk level indicators to produce a ranking of the alerts.

Flowchart 700 includes combining and representing intel and notice alert severities with the AI risk level indicators to produce a ranking of alerts 704 (e.g., see also FIG. 10). Combining at 704 may include or be based upon the categorization, differentiation and/or AI determined risk level indicators of flowchart 700.

Combining at 704 may include combining an intel and notice alert severity with the AI risk level indicator for each of the first and second plurality of traffic matrix data over the first and second time period to produce a ranking of the alert for each of the first and second plurality of traffic matrix data. Combining at 704 may include combining an intel and notice alert severity for some or for each of the first and/or second plurality of traffic matrix data over the first and/or second time period with the AI risk level indicator created at 702 for each of the first and/or second plurality of traffic matrix data over the first and/or second time period to produce a ranking of the alert for each of the first and/or second plurality of traffic matrix data over the first and/or second time period. This may be described as ranking alerts on the computer network 100.

The intel and notice alert severity for each of the first and/or second plurality of traffic matrix data over the first and/or second time period can be a note associated with a file that is part of a) the first plurality of traffic matrix data over a first time period such as the period of time period for collecting at 615; b) the second plurality of traffic matrix data over a second time period such as the period of time period for collecting at 655; or c) which is both a) and b).

The intel and notice alert severity for each of the flow first and/or second plurality of traffic matrix data over the first and/or second time period can be a rule based engine applied to the first and second plurality of traffic matrix data over the first and second time period. The intel and notice alert severity for each of the flow first and/or second plurality of traffic matrix data over the first and/or second time period can be a third party indicator applied to the first and second plurality of traffic matrix data over the first and second time period.

The intel and notice alert severity can be a file with a notice that the file meets or exceeds a certain criteria and an associated severity level for that exceeding that criteria. The Intel part can be one or more rules, such as, if an outbound file of the traffic or communication connection is greater than a certain data size, send or activate and alert. It can be a file with a notice that the file may have a virus. It can be notice that a certain virus exists or is going to activate at a certain time. The severity may be a scale from 1-10 that increases with the danger of the risk to the network devices and communication. Other scales are considered, such as other linear ranges or non-linear characterizations (e.g., exponential and/or logarithmic) of severity.

The Intel part can be that if a file is bigger than 50 megabytes (MB) active that alert or risk, and the severity might be 10 because it is important to know when such a transfer occurs. Knowing a virus is or will occur in the future can also be the Intel part. Here the risk may be between 5 and 10. The risk may be 10 at and after a time when the virus is known to activate. Detecting an unusually high number of attempts to log into an application or device can be the Intel. The number may be 3, 5, 7 or up to 12. The risk here may be between 5 and 10. Detecting a file having a known malicious reputation by examining the file's code and detecting a certain section of code may be the Intel. The risk here may be between 5 and 10. It may be 10.

Combining and representing at 704 may include combining and representing an intel and notice alert severity with the AI risk level indicator as described for FIG. 4.

Figure 9:
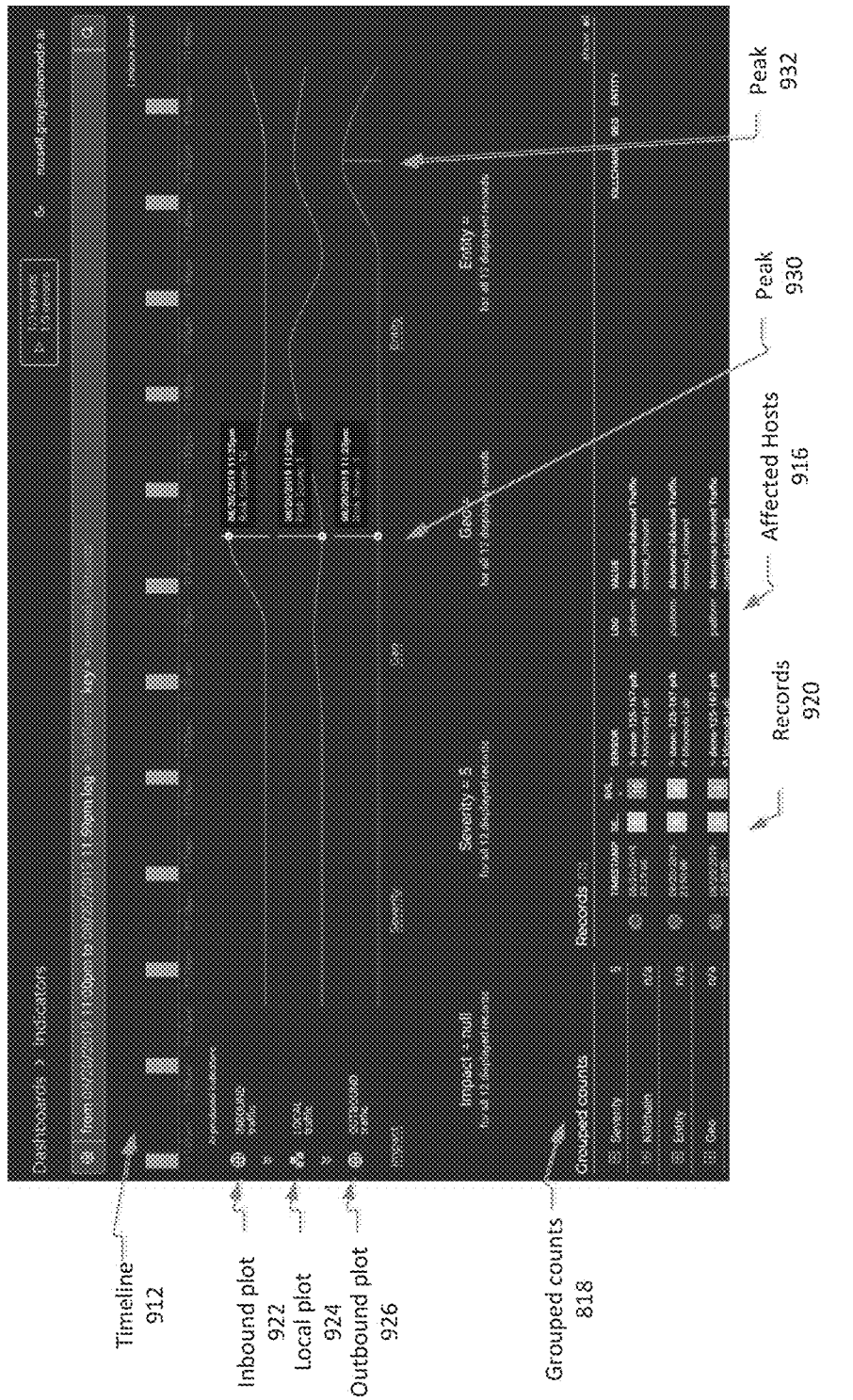
FIG. 9 is an example system GUI representing zero day risks on the computer screen.

Flowchart 700 includes creating and representing zero day risks on the computer screen 705 (e.g., see also FIG. 9). Creating and representing at 705 may include or be based upon the categorization, differentiation and/or AI determined risk level indicators of flowchart 700.

In some cases, based on only the sample baseline, the zero-day risk level indicator for the second plurality of traffic matrix data over the second time period is created at 705. Creating at 705 may include computing the sample baseline such as by testing the sample baseline to detect abnormal behavior in the network as noted for differentiating at 680.

Creating at 705 may include creating the zero day risk level indicator for only the second plurality of traffic matrix data over the second time period based on the anomalous unknown category of the sample baseline.

Such a risk may be a previously unknown threat detected in second plurality of traffic matrix data over the second time period and/or detected in the sample baseline in the last five minutes.

Creating and/or representing at 704 may include creating and/or representing zero-day alerts as described for FIG. 4.

Figure 8A:
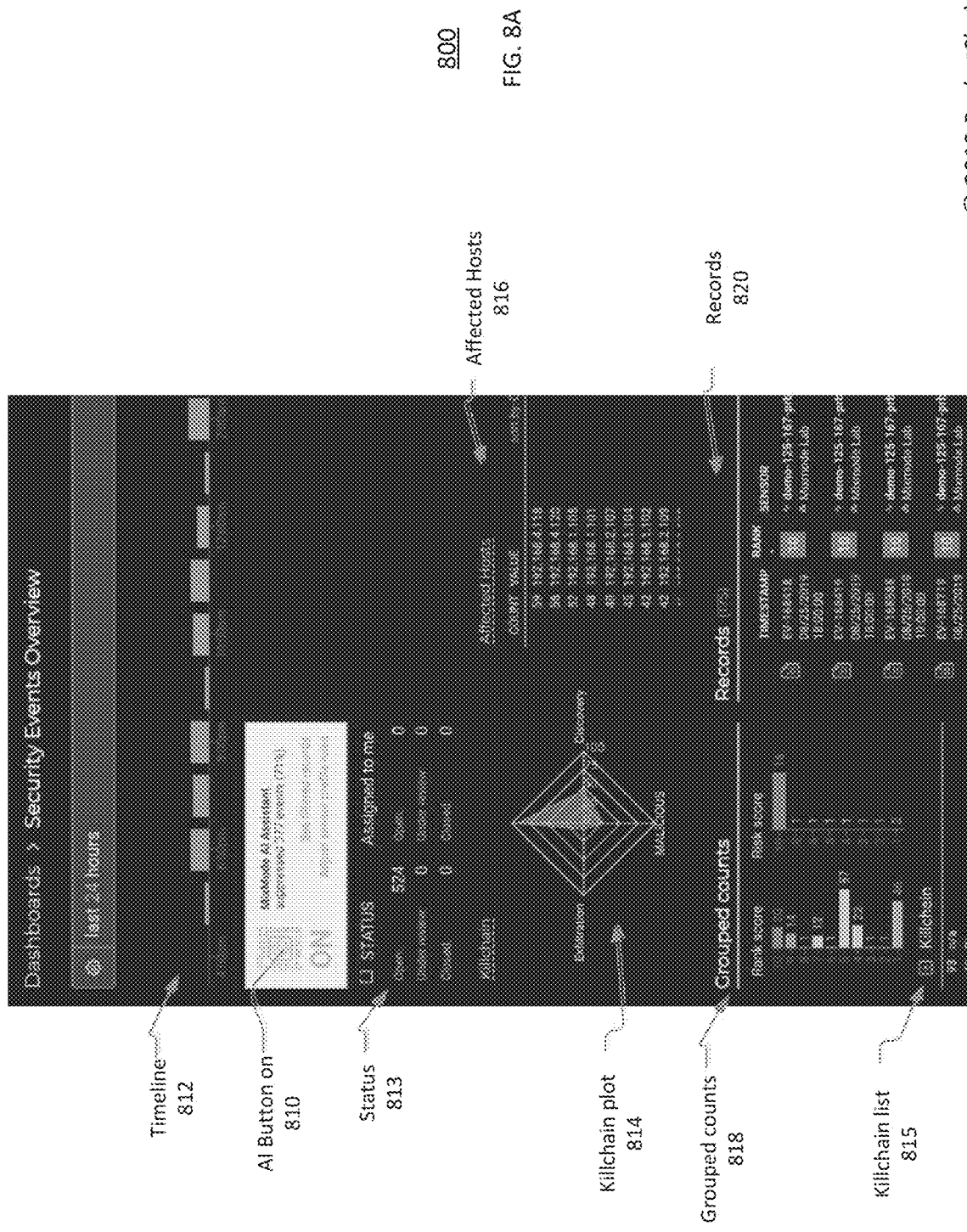
FIG. 8A is an example system GUI with an AI Button GUI in the AI-on status for reduced risk level indicators on computer screen.

Flowchart 700 includes representing an AI Button for reduced risk level indicators on computer screen 706 (e.g., see also FIG. 8A-8B). Representing at 706 may include or be based upon the categorization, differentiation and/or AI determined risk level indicators of flowchart 700.

The AI button may be based on the AI risk level indicator for each of the first and second plurality of traffic matrix data over the first and second time period having the anomalous known category and/or the anomalous unknown category. When it is in an on status the screen may only show or make a distinction to show only the AI risk level indicators for each of the first and second plurality of traffic matrix data over the first and second time period having the anomalous known category and/or the anomalous unknown category.

Representing at 705 may include representing an AI Button as described for FIG. 4. Notably, the AI button may be a GUI that represents using the created AI determined risk level indicators as noted for FIG. 4.

Flowchart 700 includes using a graphic user interface to represent the AI risk level indicators on computer screen 708 (e.g., see also FIG. 8A-10). Using at 708 may include or be based upon the categorization, differentiation and/or AI determined risk level indicators of flowchart 700.

The GUI at 708 may be used to represent the AI determined risk level indicators created at 702; the intel and notice combined with the AI determined risk level indicators at 704; the zero-day risks created at 705; and/or the AI button represented at 706 (e.g., see also FIGS. 7C-10). The GUI at 708 may be used to represent risk level indicators other than the AI determined risk level indicators and/or security events that were determined to be a security risk without the AI risk level indicator created at 702.

Representing at 708 may include representing alerts, buttons, etc. as described for FIG. 4.

The network traffic components of FIG. 7A may include local (internal to the computer network) network traffic; outbound (from inside to the computer network to the outside) network traffic; inbound (from outside to the computer network to the inside) network traffic; and/or a sub-network traffic.

Representing the alert, alarm and/or risk level indicator (e.g., a risk) at any of 704-708 may be or include displaying, visualizing, presenting and/or showing the risk on a computer screen, such as to a user. The user may interact with the displayed risk such as by activating (e.g., clicking directly on) it or another GUI object or button. In response the system will display some or all additional information known for the risk that is described herein.

FIG. 7B is a flowchart 710 for creating and representing Artificial Intelligence (AI) determined risk level indicators 730 that exist on a computer network at 100 based on timeline data for appearance of alerts. Flowchart 710 may be a method for calculating the status of a network security alert or intel. The flowchart 710 includes first creating a system baseline 712 and later creating a sample baseline 720.

Creating the system baseline 712 includes obtaining timeline data of (or flow objects that are) counts of alerts or notices over a period of time 714. Obtaining at 714 may be obtaining the timeline data for appearance of an alert or intel (e.g., see also FIG. 4). The timeline data may be for data communication connections and their related properties of network 100. This may include postprocessing unit 455 providing AI risk indicators 702 as the timeline data in place of or as data 410 to device 415. Obtaining over a period of time may include storing the timeline data over the period of time as noted for storing at 615.

Next, the timeline data is aggregated over a specified time interval 715. This may include unit 425 processing timeline data 410 to create spectral signatures 420. Next a Koopman mode representation of the first aggregated data is created 716. This may include engine 435 classifying signatures 420 from timeline data to create categories 440, 460 and 470. Next, a residual is computed by comparing the first Koopman mode representation and the aggregated data 717. Next, the system baseline for timeline data is created out of first Koopman mode representation and the residual 718. Creating at 718 may include categorization of the timeline data as described above. The categories may be components corresponding to the input flow objects that are at least one of (a) oscillating, (b) exponentially growing, (c) exponentially decaying, (d) mean, and (e) stochastic. The categories may be components. Creating at 718 may include calculating at least one of the average, periodic, exponentially growing, exponentially decaying components of the timeline data of the alert or intel.

The same process is used to create the sample baseline 720: collect timeline data over a time period 724; aggregate the timeline data 725; create the KMD of the aggregated timeline data 726; compute the residual 727; and create the baselines out of KMD and the residual of 728 for timeline data collected at 724.

The flow 710 may involve the KMD analysis of timeline data formatted in such a way involves extracting the necessary data from the database (e.g., baselines at 712 and 720), formatting it correctly for the analysis calculation, running the data through KMD algorithms and reasoning about their outputs (e.g., at 730 and 731). The input module of the system (e.g., the data collection device 415) pulls timeline data or other data from the database (e.g., JSON files) regarding the timestamps of the risks or alerts and constructs a time matrix for the window. A time matrix contains, for example, the amount or count of types of risks for each source-destination pair (each member of a pair defined by an IP address) at each arbitrarily set time step of the time window. This format is suitable as input for the provided KMD algorithms. The in-situ analysis then uses this matrix for the KMD analysis which produces Koopman eigenvalues and eigenvectors.

The sample baseline can then be tested against the system baseline to create and represent Artificial Intelligence (AI) determined risk level indicators for risk appearance based on the timeline data of appearance of alerts 730. At 730, baselines 712 and 720 can be compared by comparing at least one of the average, periodic, exponentially growing, exponentially decaying components of the timeline data of the alert or intel with the baseline model.

In some cases, creating and representing at 730 includes creating and representing as per at 702 except at 730 it is based on timeline data of appearance of alerts instead of network traffic. Creating indicators at 730 may include creating the timelines, records and/or counts of FIGS. 8A-10 based on timeline data of appearance of alerts instead of network traffic.

In some cases, creating and representing at 730 includes detecting abnormal behavior in the network as noted at 680 except at 730 it is based on timeline data of appearance of alerts instead of network traffic.

Based on the difference between the system baseline and the sample baseline, the system baseline may be updated 731. To differentiate the baselines, a comparison is made between how timeline data is categorized between the two. As explained above, these differences may be used in a feedback loop into the system baseline 712.

Based upon categorization and differentiation, network data traffic may be interdicted such as noted at 690.

The results of the comparison at 730 can be presented or represented on the computer screen. For instance, a GUI can be used to represent the AI 730 and other risk level indicators on a computer screen 732. This representing may include representing using a GUI as noted for any or all of 704-708, except the risk level indicator at 732 is based on timeline data of appearance of alerts instead of network traffic. The results can be represented in a GUI as noted for FIGS. 7D-10.

The AI determined risk indicators or alerts of flowcharts 700 and 710 can be combined. For example, indicators 702 and 730 can be combined to provide a more sophisticated and accurate evaluation of the security risk of the computer network 100. As compared to indicators 702 or 730, the combination can provide a more accurate AI analysis of the risks on the network 100.

In some case, assigning an alert or risk flowcharts 700 and 710 is informed by intelligence (e.g., intel and notice alert severity) on security events from other networks outside of the local network and/or from other subnetworks inside the local network. For example, the alerts collected at 714 and 724 can be or include third party indicators based on security events received from other networks outside of the local network 100 and/or from other subnetworks inside the local network 100.

Also, determining the status of a network security alert or intel for flowcharts 700 and 710 (e.g., collected at 714 and 724) can be or include alerts and/or intel that are informed by performance of a similar alert and/or intel on other networks, such as other than network 100. For instance, an alert and/or intel from another network may be used as an alert and/or intel for network 100.

The network components (e.g., of flow objects and/or communication connections of network 100) for flowcharts 700 and 710 may be decomposed into subnetworks, such as subnetwork 115, based on at least one of the mean, periodic, exponentially growing, exponentially decaying and stochastic components of the network traffic (e.g., stream of flow logs or traffic matrix data). Also, the outbound network traffic may be grouped into subgroups based on at least one of the mean, periodic, exponentially growing, exponentially decaying and stochastic components of the outbound network traffic. Moreover, the inbound network traffic may be grouped into subgroups based on at least one of the mean, periodic, exponentially growing, exponentially decaying and stochastic components of the inbound network traffic. In some cases, any combination of decomposing into subnetworks, grouping the outbound traffic and/or grouping the inbound traffic can be performed at once.

As noted at FIGS. 2-4, an operator 450 may be presented with a computer screen visualization or representation which represents the network as a graph and associating values to the nodes and edges of the graph. In addition, an incidence matrix of a graph can be created based on at least one of the mean, periodic, exponentially growing, exponentially decaying and stochastic components of the network traffic as described for FIGS. 4-7B. This matrix can be represented in a GUI.

Figure 7C:
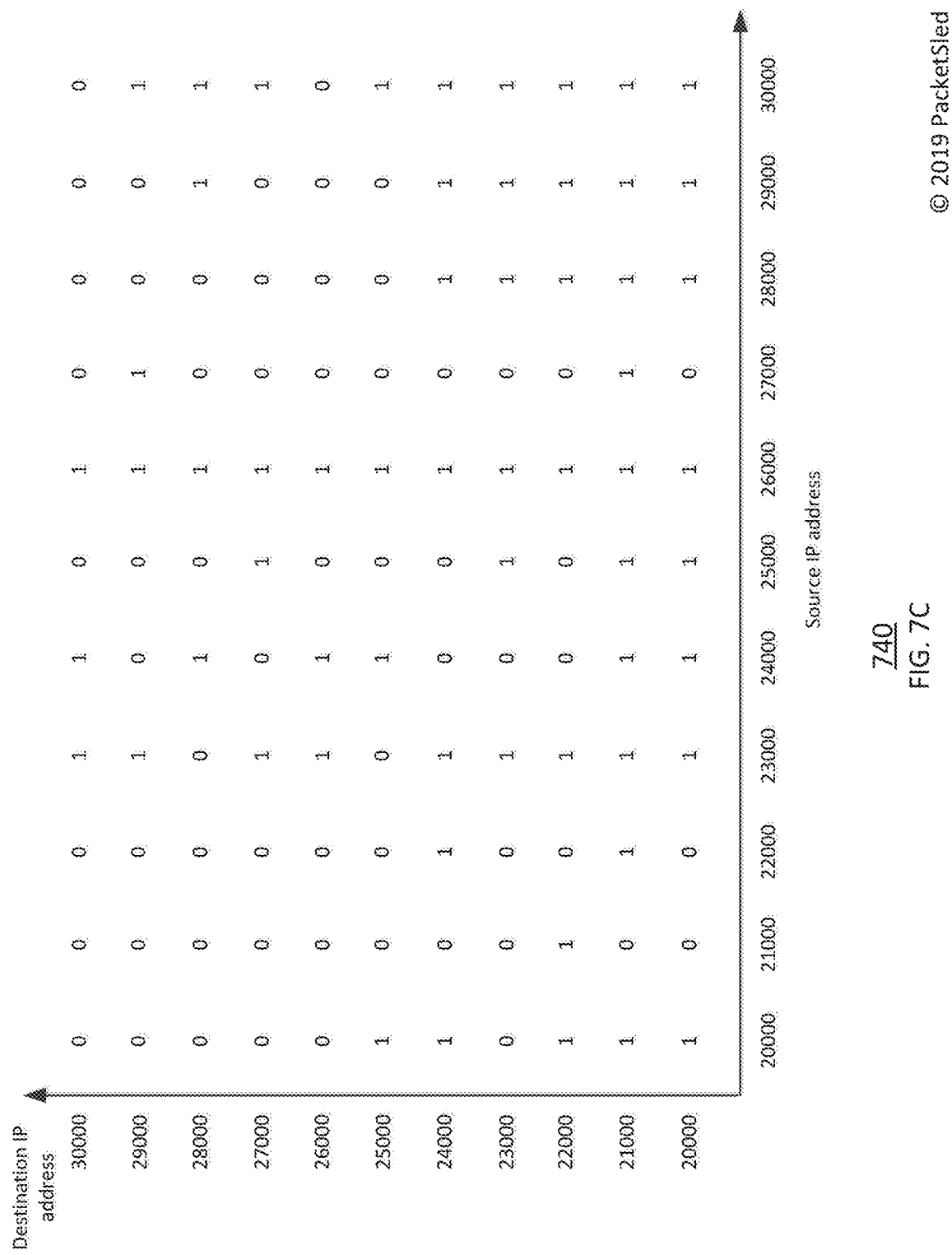
FIG. 7C is an example representation of an incidence matrix of the graph using a binary values.

For example, FIG. 7C is an example representation 740 of such an incidence matrix of the graph using a binary values. Representation 740 may be an incidence matrix of a graph created based on at least one of the mean, periodic, exponentially growing, exponentially decaying and stochastic components of the network traffic, such as noted for FIGS. 1-7B.

In some cases, representation 740 is a GUI that represents flow objects and/or communication connections between nodes of network 100. It may be a computer screen GUI which represents the network as a graph and uses binary values to represent flow objects and/or communication connections between nodes of the vertical axis of destination IP addresses and the horizontal axis of source IP addresses. A "1" represents the presence of and a "0" represents the absence of a connection between the nodes of the two associated IP addresses, such as noted for FIGS. 1-7B.

For an example representation of an incidence matrix of the graph using a two-dimensional (3D) heat map representation see FIG. 2.

Figure 7D:
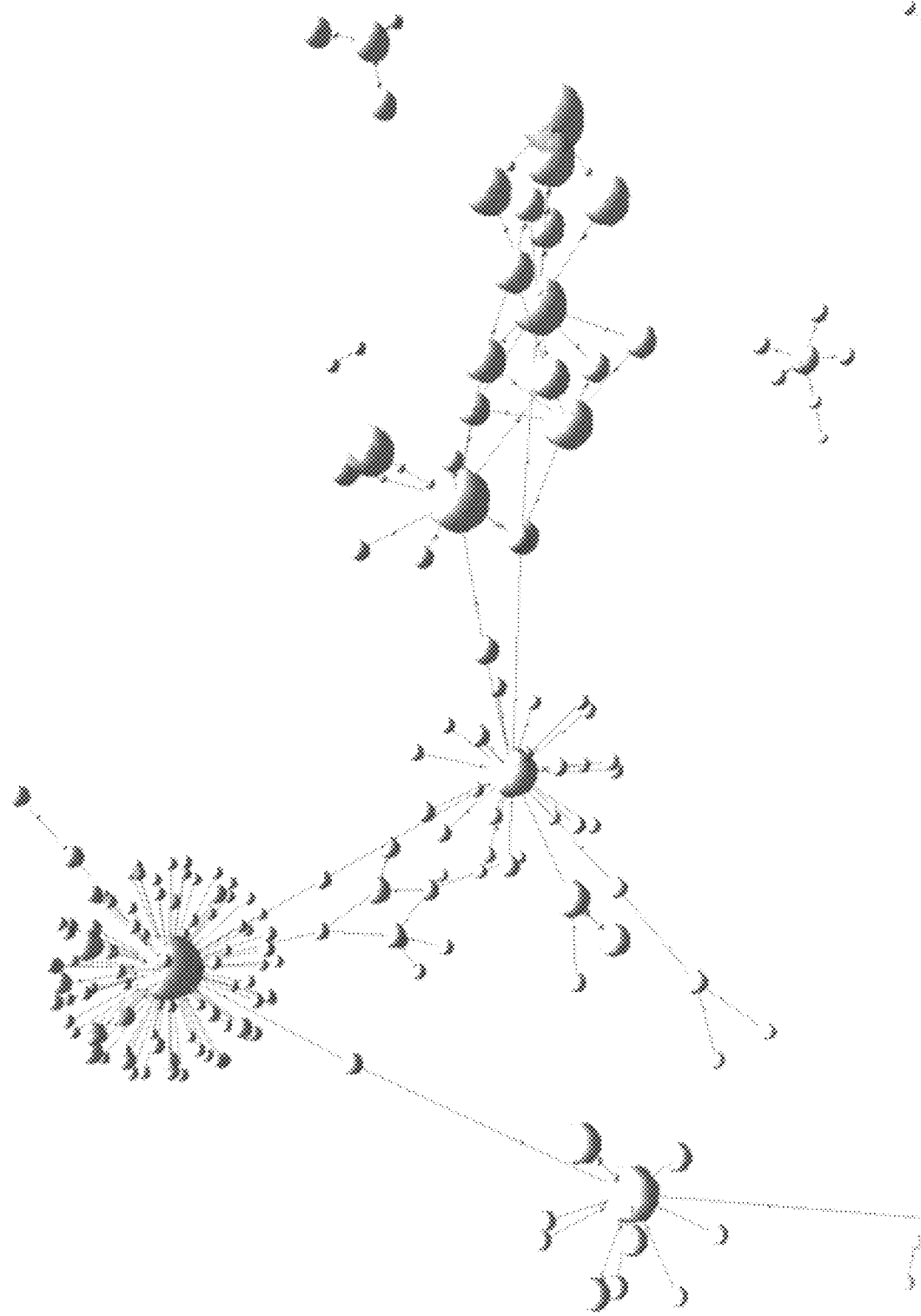
FIG. 7D is an example representation of an incidence matrix of the graph using a three-dimensional (3D) representation.

For example, FIG. 7D is an example representation 760 of such an incidence matrix of the graph using a three-dimensional (3D) representation. Representation 760 may be an incidence matrix of the graph using a three-dimensional representation, with edges labeled using the weight determined from at least one of the mean, periodic, exponentially growing, exponentially decaying and stochastic components of the inbound network traffic, such as noted for FIGS. 1-7B.

In some cases, representation 760 is a GUI that represents flow objects and/or communication connections between nodes of network 100. It may be a computer screen GUI which represents the network as a 3D space, represents nodes as spheres and uses sticks (or lines) connecting the nodes to represent flow objects and/or communication connections between nodes of the vertical axis of destination IP addresses and the horizontal axis of source IP addresses. A stick connecting two spheres represents the presence of and no stick represents the absence of a connection between the nodes of the two associated IP addresses, such as noted for FIGS. 1-7B.

The visualizations of FIGS. 7C-7D may depict at least one of the categories of FIGS. 4-7B and may depict each category differently. The visualizations may be overlaid upon a schematic or spatial network plan of the corresponding components such as that shown in FIG. 1. When the operator 450 makes interdictions or changes, the visualization may be dynamically updated to show changes in the network.

In some cases, A "1" in FIG. 7C can represents the presence of and a "0" represents the absence of a risk or alert for the node, such as a risk or alert as noted for FIGS. 1-7B. In some cases, a stick in FIG. 7D can represent the presence of and no stick can represent the absence of a risk or alert for the node, such as a risk or alert as noted for FIGS. 1-7B. In these cases, the assignment of risk may be informed by intelligence on security events from other networks outside of the local network 100.

FIGS. 8A-10 are examples of using a graphic user interface (GUI) to represent the AI risk level indicators and other risks, rankings and risk indicators of FIGS. 4-7B on a computer screen. FIGS. 8A-10 may also be examples of using a graphic user interface (GUI) to represent changes in information displayed on a computer screen as a result of the AI risk level indicators and other risks, rankings and risk indicators of FIGS. 4-7B.

FIG. 8A is an example GUI 800 of representing an AI Button GUI for reduced risk level indicators on computer screen with the AI button in the AI-on status. Having the AI button in the AI-on status may cause the above noted use of a GUI to represent risks and/or changes in information displayed as per FIGS. 4-7B. Representing the AI button GUI 810/860 may be representing a screen button that can be activated (e.g., clicked on with a pointer and the like) by a user to switch between AI-on status 810 as in FIG. 8A or AI-off status 860 as in FIG. 8B.

The example GUI 800 has an AI button in AI-on status 810; timeline 812 with risk level indicators having a level or magnitude every hour; status 813; killchain plot 814; killchain list 815; affected hosts 816; grouped counts 818; and records 820.

The AI-on status 810 button or rectangle shows the number of suppressed or reduced risks and/or ranking resulting from application of the AI-on status 810 as compared to AI-off status 860. Here, the number of risks shown in the timeline 812, records 820 and/or counts 818, are reduced by 377 or 71%; from 524 a shown at records 870 in FIG. 8B, to 175 as shown at records 820.

When, the AI screen button is showing an AI-on status 810, a list of security events that were determined by the AI described for FIGS. 4-7B to be a security risk are shown at and/or change information displayed at records 820, counts 818 and timeline 812. For instance, timeline 812 may show the volume of intel and notice security events that were determined by the AI described for FIGS. 4-7B to be a security risk, such as where the volume is a count of those risk levels every hour. In other words, these are the remaining intel and notice events used in combination 704, after application of and being reduced by the AI described for FIGS. 4-7B. This one hour period of time can be reduced, such as to 3, 5, 10 or 15 minute intervals.

In other cases, the risks at timeline 812 may be counts per each time interval over time of the AI risk level indicators 702 or 730.

The "RANK" at records 820 may be a timestamped list of the ranking of the current (list those for a certain time interval) alerts 704 for the combined intel and notice alert severities with the AI risk level indicators 702. This RANK can be a timestamped list of the ranking of the current AI risk level indicators 702 or 730. In other cases, it may be a list of the combination of indicators 702 or 730 with alerts 704.

The "Rank score" at counts 818 may be a column list of counts of rank scores 1-10 of the ranking of the alerts 704 for the combined intel and notice alert severities with the AI risk level indicators 702. It may not be the same as RANK of records 820.

As shown, records 820 and Rank score of counts 818 are both for indicators 704. For example, records 820 shows ranks having risk level indicators of 10 in red boxes, which correspond to the count of 20 of rank score 10 in counts 818. The yellow boxes may indicate risks which were suppressed (e.g., with AI on) by the AI ranking 702 and/or 730 to be lower risks than they were or to be non-risks, as compared to without that ranking (e.g., with AI off).

The "Risk score" is a column list of counts of risk scores 1-10 of the risks of the AI risk level indicators 702 or 730. Counts 818 may represent the output of the AI processing, system 400 and/or postprocessing unit 455.

Status 813 shows a status of records or events (flow and comms) that a user at user PC 180 may be reviewing, rectifying and closing using the GUI and/or as described for FIGS. 4-7B.

Killchain plot 814 shows a 2D representation of the types of notice and/or intel detected as described for FIGS. 4-7B. Here Exfiltration represents notice and/or intel of a flow object or file being transmitted outside of network 100; MALICIOUS represents notice and/or intel of a flow object or file that is detected to have a known malicious reputation; and Discovery represents notice and/or intel of a flow object or attempt to access or log into an application or computing device of network 100. Killchain list 815 shows a list corresponding to what is in plot 814.

Affected hosts 816 is a list identifying the IP hosts and the count of appearance of those hosts providing the flow objects and/or network traffic in the network 100 that are not suppressed or reduced resulting from application of the AI-on status 810 as compared to AI-off status 860. This may identify the IP hosts for the number of risks remaining in the timeline 812, records 820 and/or counts 818 after the AI suppression. It may also identify the count of the number of times that each of these IP host provides an instance of the network traffic and/or flow objects.

FIG. 8B is an example GUI 850 of representing an AI Button GUI for reduced risk level indicators on computer screen with the AI button in the AI-off status. Having the AI button in the AI-off status may cause the GUI 850 not to represent risks and/or changes in information displayed as per FIGS. 4-7B. The example GUI 850 has an AI button in AI-off status 860; timeline 862 with risk level indicators having a level or magnitude every hour; status 863; killchain plot 864; killchain list 865; affected hosts 866; grouped counts 868; and records 870.

The AI-off status 860 button or rectangle shows that no suppressed or reduced risks and/or ranking resulting from application of the AI-on status 810. Here, the number of risks is shown in the timeline 862, records 870 and/or counts 868, are 524.

When, the AI screen button is showing an AI-off status 860, a list of security events that were determined to be a security risk without the AI described for FIGS. 4-7B are shown at records 870 and counts 868.

In some cases, timeline 862 shows the volume of intel and/or notice security events that were determined to be a security risk without the AI described for FIGS. 4-7B, such as where the volume is a count of those risk levels every hour.

The "RANK" at records 870 may be a timestamped list of the ranking of the alerts for these risk without the AI described for FIGS. 4-7B. The "Rank score" at counts 868 may be a column list of counts of rank scores 1-10 of the ranking of the alerts for these risks without the AI described for FIGS. 4-7B. The "Risk score" a column list of counts of risk scores 1-10 of the risks of these risks without the AI described for FIGS. 4-7B. Counts 818 may represent an output without the AI processing of FIGS. 4-7B, system 400 and/or postprocessing unit 455.

Status 863 shows a status of records or events (flow and comms) that a user at user PC 180 may be reviewing, rectifying and closing.

Killchain plot 864 shows a 2D representation of the Exfiltration, Collection, Credential Access, MALICIOUS and Discovery risks according to records 870 without the AI described for FIGS. 4-7B. Killchain list 865 shows a list corresponding to what is in plot 864.

Impact 866 is a list identifying the IP hosts and the number of risks per host for risks that are not suppressed or reduced resulting from application of the AI-on status 860.

FIG. 9 is an example GUI 900 of representing zero day risks on the computer screen. The example GUI 900 may be for having an AI button in AI-on status (not shown) and shows timeline 912 with risk level indicators; affected hosts 916; grouped counts 918; records 920, inbound plot 922, local plot 924, outbound plot 926.

The inbound plot 922 shows a magnitude or count of the IA risks over time for network traffic that is received by or coming into network 100 from devices outside of or not included in the network 100. The inbound plot 922 has a peak indicating that there is a risk score of 10 at peak 930. Peak 930 indicates a zero-day risk. A zero-day risk may be a type of risk that is an anomaly, has not been detected prior, and/or is not a prior know risk. This is a risk included in network traffic being received by the network 100 that may be an attempt at unauthorized or hacked access to the network and thus will be beneficial to detect even though it has not been previously detected.

The local plot 924 shows a magnitude or count of the IA risks over time for network traffic that is occurring between network devices of the network 100.

The outbound plot 926 shows a magnitude or count of the IA risks over time for network traffic that sent by network devices of network 100, to devices outside of or not included in the network 100. The outbound plot 926 has a peak indicating that there is a risk score of 10 at peak 932. Peak 932 indicates a zero-day risk. This is a risk included in network traffic being sent out by the network 100 that may have resulted from an unauthorized or hacked access to the network and thus will be beneficial to detect even though it has not been previously detected. A user may associate the peaks 930 and 932 to determine that network 100 has been hacked by inbound peak 930 to perform outbound peak 932.

FIG. 10 is representation 1000 of combined intel and notice alert severities with the AI risk level indicators 702 to produce a ranking of the alerts. The representation 1000 has an AI button in AI-on status 1010; timeline 1012 with risk level indicators having a level or count every hour; status 1013; killchain plot 1014; killchain list 1015; affected hosts 1016; grouped counts 1018; records 1020; risk score 1022; inbound plot 1022; local plot 1024 and outbound plot 1026.

The AI-on status 1010; timeline 1012; status 1013; killchain plot 1014; killchain list 1015; affected hosts 1016; grouped counts 1018 and records 1020 may be similar to those corresponding features described for FIG. 8A.

The inbound plot 1022; local plot 1024 and outbound plot 1026 and peaks of those plots may be similar to those corresponding features described for FIG. 9. Consequently, representation 1000 includes at least a combination of features from FIGS. 8A and 9, as well as other features such as the Risk Score circle that may represent peaks over a period of time for any one of inbound plot 1022; local plot 1024 and outbound plot 1026. It may also represent peaks for a mathematical combination of any two or all of inbound plot 1022; local plot 1024 and outbound plot 1026.

Communication data from, to, and/or of the "cloud" can be a data source for the embodiments herein. For example, one or more clouds can be part of network 100. A cloud may be a server, a server farm, a number of servers, a number of flow objects and/or a number of computing devices that work together to provide at least one computing resource to a user that remote from or outside of the cloud. It may be on-demand availability of computer system resources, especially data storage and computing power, without direct active management by the user. It may be a data center available to many users over the Internet. It may have functions distributed over multiple locations from central servers. It may rely on sharing of resources to achieve coherence and economies of scale.

For example, a flow object and/or network traffic, such as noted for FIGS. 4, 6, 7A and 8A-10, may be communication data received from and transmitted to one or more IP addresses of a cloud. Here, they may be communication data transmitted between IP addresses within the cloud that is detected by a sensor of system 400. Also, a count of risks and/or alerts, such as noted for FIGS. 4, 6, 7B and 8A-10, may be or include risks and/or alerts based on these flow objects and/or network traffic of a cloud. Also, intel and/or notices, such as noted for FIGS. 4-10, may be or include intel and/or notices based on or from a cloud.

Descriptions for any of the FIGS. 1-10 herein can be combined. For example, description for FIGS. 4 and 7A-10 can be combined with those of FIG. 6 such that the updates 685 and interdiction 690 can occur while the AI risk levels are created at 702 and/or 730, while the AI risk levels are used at 704-708 and/or 732; and/or while representations of FIGS. 8A-10 are performed. In addition, differentiating at 680 can be part of or occur simultaneous with creating at 702 and/or 730.

The description for FIGS. 4 and 7A-10 can also be combined allowing network activity associated with normal behavior, and interdicting network activity associated with anomalous known behavior or anomalous unknown behavior; and flow objects that each include a single alphanumeric value or a set of alphanumeric values collected from the data collection devices or sensors over time.

Using the above described technologies (e.g., see the system 400 and processes of FIGS. 4-7B) of splitting of the behavior categories between average behavior and behavior that is periodic, such as on daily time scales or weekly, etc., it is possible to identify increased or heavy network communication behavior that is seemingly random, which may be result of when users type and send communications at any spur of the moment. Using those technologies it is possible to recognize that, if today is a day when people are sending seemingly increased or heavy random communications, the AI risk level indicators 702 and/or 730 can be used to look at whether on this certain weekday and time (e.g., Monday night football or Wednesday at noon) this apparent randomness does not look very different at a scale that might be larger volume; might be a larger average; and/or might be larger oscillation. Here, the random effects can be summarized in the distribution that is compared to a system baseline.

Using the above described technologies (e.g., see the system 400, processes of FIGS. 4-7B, and FIGS. 7C-10) it is possible to present the above results to the user in an easy to understand GUI that they can more efficiently interact with to determine which risks can cause the most damage to the network or it's communications abilities such as by looking at what are the modes of the at risk connections, what are the underlying pipeline of data and things of that sort for these connections (e.g., using the AI button).

For example, turning on the AI button may cause the alerts to depend on the AI analysis (e.g., FIGS. 4-7B) of network traffic such that risks or traffic is determined to be normal for many of the non-AI determined risks. Thus, these alerts are not shown or highly ranked when the AI button is in the on status and the number of high level risks or alerts is reduced tremendously. It can be reduced by up to 98% and/or 2160 alerts for a network, thus massively reducing the number of risks a system 400 user or network administrator would have otherwise had to look at. In addition, the system user can still analyze the total number of alerts with AI on or off; and/or suppressed them with AI on.

For example, a type of risk may send an alert for a large outbound file transfer of larger than 50 MB and the severity of this is 10. It might be what a user of the system wants to see an alert for. However, this alert does not let the user know if the size of the file is 50 MM, 300 MB or 6 GB. So, the system takes into account other context or Intel to determine whether this alert is really a dangerous thing or not to the network and its ability to communicate. In particular, all the traffic on the network and/or timeline data of risks can be taken in context when ranking the risks at 702 and/or 730, or as Intel. This risk may be reduced in rank or not a risk when taken in the context that the other traffic looks pretty normal during the alert.

For example, the context may show that at this time of day with the kind of communication exchanges that users are doing, a large outbound file transfer of larger than 50 MB is totally normal and does not need to be a worry. It may be true a 50 MB file was sent out, but that may be something this user does this time of the day, every day and is not a risk for a hack or other dangerous behavior on the network.

Figure 5:
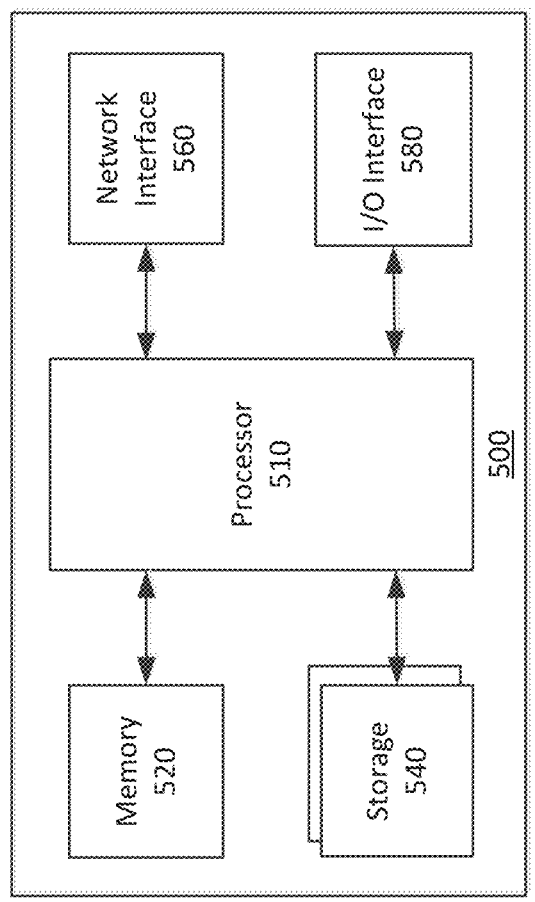
FIG. 5 is a block diagram of a computing device.

Referring now to FIG. 5, there is shown a computing device 500. The computing device 500 may be a node, such as a laptop 185, a user PC 180, a server 170 or a printer 140 (FIG. 1). The computing device 500 may be a network interface device such as a layer 2 switch 175, a layer 3 switch 145, a firewall 130, a router 120, a WLAN controller 150, or a wireless access point 155. The computing device 500 may be or include system 400. The computing device 500 may be for performing the process of flow diagrams 600, 700 and 710. The computing device 500 may be for representing, visualizing and/or showing the GUI of FIGS. 7C-10. A computing device as used herein refers to an electronic device with a processor, memory and a non-volatile machine readable storage medium that may execute instructions including, but not limited to, personal computers and server computers. The computing device 500 may include software and/or hardware for providing functionality and features described herein. The computing device 500 may therefore include one or more of: logic arrays, memories, analog circuits, digital circuits, software, firmware and processors. The hardware and firmware components of the computing device 500 may include various specialized units, circuits, software and interfaces for providing the functionality and features described herein. For example, a global positioning system (GPS) receiver or similar hardware may provide location-based services.

The computing device 500 has a processor 510 coupled to a memory 520, non-volatile machine-readable medium 540, a network interface 560 and an I/O interface 580. The processor 510 and the memory 520 comprise circuits and software for performing the instructions on the non-volatile machine-readable medium 540.

The processor 510 may be or include one or more microprocessors, field programmable gate arrays (FPGAs), application specific integrated circuits (ASICs), programmable logic devices (PLDs) and programmable logic arrays (PLAs).

The non-volatile machine readable storage medium 540 may be a storage device included with or otherwise coupled or attached to the data processing system 500. That is, the software may be stored in electronic, machine readable media. These storage media include, for example, magnetic media such as hard disks and solid state electronic memory.

As used herein, a storage device is a device that allows for reading and/or writing to a storage medium. The non-volatile machine-readable medium 540 provides non-volatile, bulk or long-term storage of data or instructions in the computing device 500. Multiple storage devices may be provided or available to the computing device 500. Some of these storage devices may be external to the computing device 500, such as network storage or cloud-based storage. In some cases, such as those involving solid state memory devices, the memory 520 and storage 540 may be unitary.

The memory 520 may be or include RAM, ROM, DRAM, SRAM and MRAM, and may include firmware, such as static data or fixed instructions, BIOS, system functions, configuration data, and other routines used during the operation of the computing device 500 and processor 510. The memory 520 also provides a storage area for data and instructions associated with applications and data handled by the processor 510. As used herein the term memory corresponds to the memory 520 and explicitly excludes signals or waveforms.

The network interface 560 includes an interface to a network such as a network that can be used to communicate calls, signals, streams, arrays, flagged samples and feedback described herein. The network interface 560 may be wired (e.g., electronic or optical) or wireless.

The I/O interface 580 interfaces the processor 510 to peripherals (not shown) such as displays, video and still cameras, microphones, user input devices such as keyboards and USB devices.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. An apparatus comprising a non-volatile machine-readable medium storing a program having instructions which when executed by a processor will cause the processor to create Artificial Intelligence (AI) determined risk level indicators on a computer data network, the instructions of the program for:

decomposing a stream of flow objects from a plurality of sensors coupled to the data network into components that are at least one of (a) oscillating, (b) exponentially growing, (c) exponentially decaying, (d) mean, and (e) stochastic;

sorting the components into categories including at least normal, anomalous known and anomalous unknown, wherein the normal category is indicative of normal behavior in the corresponding flow objects, the anomalous known category is indicative of anomalous behavior in the corresponding flow objects having a known cause, and the anomalous unknown category is indicative of anomalous behavior in the corresponding flow objects having an unknown cause; and creating an Artificial Intelligence (AI) determined risk level indicator for each of the flow objects from at least one of the normal behavior, anomalous known behavior and anomalous unknown behavior of each of the flow objects.

2. The apparatus of claim 1, wherein the Artificial Intelligence (AI) determined risk level indicator for each of the flow objects is based on the anomalous known category or the anomalous unknown category.

3. The apparatus of claim 1, wherein decomposing and sorting uses a Koopman mode representation of the stream of flow objects; and wherein the stream of flow objects includes communication data from, to, or within a cloud.

4. The apparatus of claim 1, further comprising:
  using a graphic user interface (GUI) to represent the AI risk level indicators; and one of a) an intel and notice combined with the AI determined risk level indicators; b) zero-day risks; or c) an AI button for reduced risk level indicators.

5. The apparatus of claim 4, further comprising combining an intel and notice alert severity with the AI risk level indicator for each of the flow objects to produce the ranking of the alert for each of the flow objects.

6. The apparatus of claim 5, wherein the intel and notice alert severity for each of the flow objects comprises one of a) a note associated with a file that is part of the stream of flow objects, b) a rule based engine applied to the stream of flow objects or c) a third party indicator applied to the stream of flow objects.

7. The apparatus of claim 1, further comprising:
  using the AI risk level indicator for each of the flow objects based on the anomalous unknown category to create and represent zero day risks on the computer screen, wherein the zero day risk is one of a real time threat discovery, an immediate threat discovery or current threat discovery.

8. The apparatus of claim 1, further comprising:
  representing an AI button for reduced risk level indicators on computer screen wherein the AI button is based on the AI risk level indicator for each of the flow objects having the anomalous known category or the anomalous unknown category.

9. The apparatus of claim 8, wherein representing the AI button comprises representing a screen button showing the indicator of AI-on or AI-off status;

when the AI screen button is in AI-on status, representing a list of security events that were determined by the AI risk level indicator to be a security risk and a timeline showing the volume of security events that were determined by the AI risk level indicator to be a security risk;

when the AI screen button is in AI-off status, representing a list of security events that were determined to be a security risk without the AI risk level indicator and a timeline of security events that were determined to be a security risk without the AI risk level indicator.

10. A system for processing network data that consists of at least two devices where at least one of the devices is sending data over a physical or wireless connection to the other, the system comprising:

a data collection device for collecting a stream of flow objects from a plurality of sensors coupled to the data network, wherein the stream of flow objects consists of a finite dimensional nonlinear system;

a preprocessing unit containing at least an analysis unit for decomposing the stream of flow objects into components that are at least one of (a) oscillating, (b) exponentially growing, (c) exponentially decaying, (d) mean, and (e) stochastic, an analysis unit for sorting the components into categories including normal, anomalous known and anomalous unknown, wherein the normal category is indicative of normal behavior in the corresponding flow objects, the anomalous known category is indicative of anomalous behavior in the corresponding flow objects having a known cause, and the anomalous unknown category is indicative of anomalous behavior in the corresponding flow objects having an unknown cause; and a postprocessing unit for:
    creating an Artificial Intelligence (AI) determined risk level indicator for each of the flow objects from at least one of the normal behavior, anomalous known behavior and anomalous unknown behavior of each of the flow objects.

11. The system of claim 10, wherein the Artificial Intelligence (AI) determined risk level indicator for each of the flow objects is based on the anomalous known category or the anomalous unknown category.

12. The system of claim 10, wherein decomposing and sorting uses a Koopman mode representation of the stream of flow objects; and wherein the stream of flow objects includes communication data from, to, or within a cloud.

13. The system of claim 10, further comprising
  using a graphic user interface (GUI) to represent the AI risk level indicators; and one of a) intel and notice combined with the AI determined risk level indicators; b) zero-day risks; or c) an AI button for reduced risk level indicators.

14. The system of claim 13, further comprising combining an intel and notice alert severity with the AI risk level indicator for each of the flow objects to produce the ranking of the alert for each of the flow objects.

15. The system of claim 14, wherein the intel and notice alert severity for each of the flow objects comprises one of a) a note associated with a file that is part of the stream of flow objects, b) a rule based engine applied to the stream of flow objects or c) a third party indicator applied to the stream of flow objects.

16. The system of claim 10, further comprising:
  using the AI risk level indicator for each of the flow objects based on the anomalous unknown category to create and represent zero day risks on the computer screen, wherein the zero day risk is one of a real time, immediate or current threat discovery.

17. The system of claim 10, further comprising:
representing an AI button for reduced risk level indicators on computer screen wherein the AI button is based on the AI risk level indicator for each of the flow objects having the anomalous known category or the anomalous unknown category.

18. The system of claim 17, wherein representing the AI button comprises representing a screen button showing the indicator of AI-on or AI-off status;
when the AI screen button is in AI-on status, representing a list of security events that were determined by the AI risk level indicator to be a security risk and a timeline showing the volume of security events that were determined by the AI risk level indicator to be a security risk;
when the AI screen button is in AI-off status, representing a list of security events that were determined to be a security risk without the AI risk level indicator and a timeline of security events that were determined to be a security risk without the AI risk level indicator.

19. A method of creating Artificial Intelligence (AI) determined risk level indicators on a computer network using a programmed data processing apparatus, the programmed data processing apparatus comprising a processor and memory, the method comprising the processor performing steps according to a program including:
creating a system baseline comprising:
collecting a first plurality of traffic matrix data over a first time period;
aggregating the first plurality of traffic matrix data over a specified time interval into first aggregated data;
creating a first representation of the first aggregated data;
computing a first residual by comparing the first representation and the first aggregated data;
creating the system baseline out of the first representation and the first residual, wherein the system baseline categorizes each of the traffic matrix data of the first plurality of traffic matrix data as one of normal, anomalous known or anomalous unknown;
creating a sample baseline comprising:
collecting a second plurality of traffic matrix data over a second time period;
aggregating the second plurality of traffic matrix data over a specified time interval into second aggregated data;
creating a second representation of the second aggregated data;
computing a second residual by comparing the second representation and the second aggregated data;
creating a second data representation out of the second representation and the second residual, wherein the sample baseline categorizes each of the traffic matrix data of the second plurality of traffic matrix data as one of normal, anomalous known or anomalous unknown;
computing a difference of the sample baseline and the system baseline;
based on the difference between the system baseline and the sample baseline, creating an Artificial Intelligence (AI) determined risk level indicator for each of the first and second plurality of traffic matrix data over the first and second time period.

20. The method of claim 19, wherein the Artificial Intelligence (AI) determined risk level indicator for each of the first and second plurality of traffic matrix data over the first and second time period is based on the anomalous known category or the anomalous unknown category of one of a) the difference between the system baseline and the sample baseline, b) the system baseline, or c) the sample baseline.

21. The method of claim 19, wherein creating the first representation of the first aggregated data is creating a first Koopman mode representation of the first aggregated data, wherein creating the second representation of the second aggregated data is creating a second Koopman mode representation of the second aggregated data; and wherein at least one of the first plurality of traffic matrix data or the second plurality of traffic matrix data includes communication data from, to, or within a cloud.

22. The method of claim 19, further comprising:
using a graphic user interface (GUI) to represent the AI risk level indicators; and one of a) an intel and notice combined with the AI determined risk level indicators; b) zero-day risks; or c) an AI button for reduced risk level indicators.

23. The method of claim 19, further comprising:
combining an intel and notice alert severity with the AI risk level indicator for each of the first and second plurality of traffic matrix data over the first and second time period to produce a ranking of the alert for each of the first and second plurality of traffic matrix data.

24. The method of claim 23, wherein the intel and notice alert severity for each of the flow objects comprises one of a note associated with a file that is part of a) the first plurality of traffic matrix data over a first time period; b) the second plurality of traffic matrix data over a second time period; or c) both a) and b).

25. The method of claim 24, wherein the intel and notice alert severity for each of the flow objects comprises b) a rule based engine applied to the first and second plurality of traffic matrix data over the first and second time period or c) a third party indicator applied to the first and second plurality of traffic matrix data over the first and second time period.

26. The method of claim 19, further comprising:
using the AI risk level indicator for the second plurality of traffic matrix data over the second time period to create and represent zero day risks on the computer screen; wherein the zero day risk is one of a real time, immediate or current threat discovery; and wherein the zero day risk is a previously unknown threat detected based on one of an abnormal unknown category or only on the current baseline information.

27. The method of claim 19, further comprising:
representing an AI button for reduced risk level indicators on computer screen wherein the AI button is based on the AI risk level indicator for each of the first and second plurality of traffic matrix data over the first and second time period having the anomalous known category or the anomalous unknown category.

28. The method of claim 27, wherein representing the AI button comprises representing a screen button showing the indicator of AI-on or AI-off status;
when the AI screen button is in AI-on status, representing a list of security events that were determined by the AI risk level indicator to be a security risk and a timeline showing the volume of security events that were determined by the AI risk level indicator to be a security risk;
when the AI screen button is in AI-off status, representing a list of security events that were determined to be a security risk without the AI risk level indicator and a timeline of security events that were determined to be a security risk without the AI risk level indicator.

* * * * *